(12) United States Patent
Kim et al.

(10) Patent No.: US 12,738,490 B2
(45) Date of Patent: Sep. 15, 2026

(54) NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

(71) Applicant: SAMSUNG SDI CO., LTD., Yongin-si (KR)

(72) Inventors: Jongmin Kim, Yongin-si (KR); Jiyoon Kim, Yongin-si (KR); Pilsang Yun, Yongin-si (KR); Donggyu Chang, Yongin-si (KR); Kwanghwan Cho, Yongin-si (KR); Jangsuk Hyun, Yongin-si (KR); Jinhwa Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 300 days.

(21) Appl. No.: 18/316,175

(22) Filed: May 11, 2023

(65) Prior Publication Data

US 2023/0282825 A1 Sep. 7, 2023

Related U.S. Application Data

(63) Continuation of application No. 18/158,274, filed on Jan. 23, 2023, which is a continuation of application (Continued)

(30) Foreign Application Priority Data

Jul. 20, 2016 (KR) ........................ 10-2016-0092244
Nov. 30, 2016 (KR) ........................ 10-2016-0162292

(51) Int. Cl.
*H01M 4/525* (2010.01)
*C01G 53/50* (2025.01)
(Continued)

(52) U.S. Cl.
CPC .......... *H01M 4/525* (2013.01); *C01G 53/502* (2025.01); *C01G 53/504* (2025.01);
(Continued)

(58) Field of Classification Search
CPC .............................. H01M 4/525; H01M 4/505
See application file for complete search history.

(56) References Cited

U.S. PATENT DOCUMENTS 8,486,564 B2 7/2013 Nagai et al.
8,728,666 B2 5/2014 Itou et al.
(Continued)

FOREIGN PATENT DOCUMENTS

CN 101002351 A 7/2007
CN 101167209 A 4/2008
(Continued)

OTHER PUBLICATIONS

Espacenet machine translation of CN 109244390A (Year: 2019).
(Continued)

*Primary Examiner* — Nathanael T Zemui
(74) *Attorney, Agent, or Firm* — Womble Bond Dickinson (US) LLP

(57) ABSTRACT

A nickel-based active material for a lithium secondary battery, a method of preparing the nickel-based active material, and a lithium secondary battery including a positive electrode including the nickel-based active material, the nickel-based active material comprising a secondary particle having an outer portion with a radially arranged structure and an inner portion with an irregular porous structure, wherein the inner portion of the secondary particle has a larger pore size than the outer portion of the secondary particle.

21 Claims, 25 Drawing Sheets

Related U.S. Application Data

No. 15/654,623, filed on Jul. 19, 2017, now Pat. No. 11,569,503.

(51) Int. Cl.

| | |
|---|---|
| ***C01G 53/502*** | (2025.01) |
| ***C01G 53/504*** | (2025.01) |
| ***C01G 53/506*** | (2025.01) |
| ***H01M 4/02*** | (2006.01) |
| ***H01M 4/485*** | (2010.01) |
| ***H01M 10/052*** | (2010.01) |

(52) U.S. Cl.

CPC .......... *C01G 53/506* (2025.01); *H01M 4/485* (2013.01); *H01M 10/052* (2013.01); *C01P 2002/72* (2013.01); *C01P 2002/85* (2013.01); *C01P 2004/03* (2013.01); *C01P 2004/50* (2013.01); *C01P 2004/90* (2013.01); *C01P 2006/12* (2013.01); *C01P 2006/16* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 9,337,487 | B2 | 5/2016 | Sun et al. | |
| 9,450,229 | B2 | 9/2016 | Uwai et al. | |
| 9,559,351 | B2 | 1/2017 | Mori et al. | |
| 9,577,254 | B2 | 2/2017 | Nagai | |
| 9,601,770 | B2 | 3/2017 | Park et al. | |
| 9,899,674 | B2 | 2/2018 | Hirai et al. | |
| 10,020,507 | B2 | 7/2018 | Kobayashi et al. | |
| 10,396,356 | B2 | 8/2019 | Toya et al. | |
| 10,833,329 | B2 | 11/2020 | Kim et al. | |
| 2007/0292764 | A1 | 12/2007 | Soma et al. | |
| 2009/0029253 | A1* | 1/2009 | Itou | H01M 10/0525 429/223 |
| 2012/0217435 | A1 | 8/2012 | Yamamoto et al. | |
| 2012/0231322 | A1 | 9/2012 | Chu et al. | |
| 2013/0045421 | A1 | 2/2013 | Kobino et al. | |
| 2014/0087265 | A1* | 3/2014 | Yura | H01M 4/131 429/231.1 |
| 2014/0205898 | A1 | 7/2014 | Lee et al. | |
| 2014/0335417 | A1 | 11/2014 | Nagai | |
| 2015/0064557 | A1 | 3/2015 | Kim et al. | |
| 2015/0086787 | A1 | 3/2015 | Yura et al. | |
| 2015/0093580 | A1* | 4/2015 | Kobayashi | H01M 4/525 428/403 |
| 2015/0325844 | A1 | 11/2015 | Inoue | |
| 2016/0036041 | A1* | 2/2016 | Uwai | C01G 53/50 429/231.1 |
| 2016/0049647 | A1* | 2/2016 | Park | C01G 53/82 429/209 |
| 2016/0079597 | A1 | 3/2016 | Fujiki et al. | |
| 2016/0181597 | A1 | 6/2016 | Kim et al. | |
| 2016/0190573 | A1 | 6/2016 | Sun et al. | |
| 2016/0351899 | A1 | 12/2016 | Iwasaki | |
| 2017/0207453 | A1* | 7/2017 | Oda | C01G 53/82 |
| 2017/0222221 | A1 | 8/2017 | Park et al. | |
| 2017/0352885 | A1 | 12/2017 | Kondo et al. | |
| 2018/0026267 | A1 | 1/2018 | Kim et al. | |
| 2018/0026268 | A1 | 1/2018 | Kim et al. | |
| 2018/0047979 | A1 | 2/2018 | Iwasaki | |
| 2018/0108940 | A1 | 4/2018 | Kwon et al. | |
| 2018/0166687 | A1 | 6/2018 | Chang et al. | |
| 2018/0212237 | A1 | 7/2018 | Lee et al. | |
| 2018/0219216 | A1 | 8/2018 | Choi et al. | |
| 2019/0148721 | A1 | 5/2019 | Park et al. | |
| 2019/0173076 | A1 | 6/2019 | Kim et al. | |
| 2019/0190018 | A1 | 6/2019 | Aoki et al. | |
| 2019/0260024 | A1 | 8/2019 | Nakamura et al. | |
| 2019/0386299 | A1 | 12/2019 | Tochio et al. | |
| 2020/0028168 | A1 | 1/2020 | Ju et al. | |
| 2020/0185709 | A1 | 6/2020 | Zhou et al. | |
| 2020/0185714 | A1 | 6/2020 | Han et al. | |
| 2020/0313180 | A1 | 10/2020 | Ryoshi et al. | |
| 2020/0350582 | A1 | 11/2020 | Kim et al. | |
| 2020/0358094 | A1 | 11/2020 | Oshita et al. | |
| 2021/0083287 | A1 | 3/2021 | Ahn et al. | |
| 2021/0135212 | A1 | 5/2021 | Choi et al. | |
| 2021/0135215 | A1 | 5/2021 | Kil | |
| 2021/0143413 | A1 | 5/2021 | Lee | |
| 2021/0167379 | A1 | 6/2021 | Kim et al. | |
| 2021/0265628 | A1 | 8/2021 | Kim et al. | |
| 2022/0069301 | A1 | 3/2022 | Yun | |
| 2022/0149354 | A1 | 5/2022 | Omura et al. | |
| 2022/0255072 | A1 | 8/2022 | Yun et al. | |
| 2022/0271283 | A1 | 8/2022 | Sun et al. | |
| 2022/0388852 | A1 | 12/2022 | Nam et al. | |

FOREIGN PATENT DOCUMENTS

| | | | |
|---|---|---|---|
| CN | 20120231322 | A | 4/2008 |
| CN | 102576873 | A | 7/2012 |
| CN | 104303345 | A | 1/2015 |
| CN | 104521039 | A | 4/2015 |
| CN | 105051952 | A | 11/2015 |
| CN | 105070896 | A | 11/2015 |
| CN | 105453311 | A | 3/2016 |
| CN | 106207107 | A | 12/2016 |
| CN | 108155357 | A | 6/2018 |
| CN | 109244390 | A | 1/2019 |
| CN | 109643800 | A | 4/2019 |
| CN | 110713215 | A | 1/2020 |
| CN | 112751018 | A | 5/2021 |
| CN | 112751025 | A | 5/2021 |
| EP | 2485305 | A1 | 8/2012 |
| EP | 2882013 | A1 | 6/2015 |
| EP | 2975680 | A1 | 1/2016 |
| EP | 3272710 | A1 | 1/2018 |
| EP | 3734720 | A1 | 11/2020 |
| JP | 2001-243951 | A | 9/2001 |
| JP | 2008-251434 | A | 10/2008 |
| JP | 2012-254889 | A | 12/2012 |
| JP | 2013-118156 | A | 6/2013 |
| JP | 2013-206556 | A | 10/2013 |
| JP | 2014-67645 | A | 4/2014 |
| JP | 2015-72800 | A | 4/2015 |
| JP | 2015-76397 | A | 4/2015 |
| JP | 2016-004703 | A | 1/2016 |
| JP | 2016-4703 | A | 1/2016 |
| JP | 2016-127004 | A | 7/2016 |
| JP | 2018-14325 | A | 1/2018 |
| JP | 2020-74264 | A | 5/2020 |
| JP | 6705068 | B1 | 6/2020 |
| JP | 2020-102432 | A | 7/2020 |
| JP | 2021-77643 | A | 5/2021 |
| KR | 10-2009-0126962 | A | 12/2009 |
| KR | 10-2010-0099337 | | 9/2010 |
| KR | 10-2012-0103263 | A | 9/2012 |
| KR | 10-2014-0093529 | | 7/2014 |
| KR | 10-2015-0016125 | A | 2/2015 |
| KR | 10-2015-0026863 | A | 3/2015 |
| KR | 10-2015-0090963 | A | 8/2015 |
| KR | 10-2015-0119876 | A | 10/2015 |
| KR | 10-2015-0122172 | A | 10/2015 |
| KR | 10-2016-0032664 | A | 3/2016 |
| KR | 10-2016-0041039 | | 4/2016 |
| KR | 10-2016-0049995 | A | 5/2016 |
| KR | 10-2017-0096673 | A | 8/2017 |
| KR | 10-2017-0103699 | A | 9/2017 |
| KR | 10-2018-0010122 | A | 1/2018 |
| KR | 10-1886514 | B1 | 8/2018 |
| KR | 10-2019-0032248 | A | 3/2019 |
| KR | 10-2019-0065963 | A | 6/2019 |
| KR | 10-2019-0078498 | A | 7/2019 |
| KR | 10-2020-0019571 | A | 2/2020 |
| KR | 10-2020-0033354 | A | 3/2020 |
| KR | 10-2020-0044448 | A | 4/2020 |
| KR | 10-2020-0070649 | A | 6/2020 |
| KR | 10-2020-0090727 | A | 7/2020 |
| KR | 10-2021-0007808 | A | 1/2021 |
| WO | WO 2006/010894 | A1 | 2/2006 |

(56) References Cited

FOREIGN PATENT DOCUMENTS

| | | | |
|---|---|---|---|
| WO | WO 2011/086690 | A1 | 7/2011 |
| WO | 2012/124256 | A1 | 9/2012 |
| WO | WO 2012/131779 | A1 | 10/2012 |
| WO | WO 2012/131881 | A1 | 10/2012 |
| WO | WO 2014/061399 | A1 | 4/2014 |
| WO | WO 2014/142279 | A1 | 9/2014 |
| WO | WO 2015/108163 | A1 | 7/2015 |
| WO | WO 2016/060451 | A1 | 4/2016 |
| WO | WO 2016/068594 | A1 | 5/2016 |
| WO | WO 2016/175597 | A1 | 11/2016 |
| WO | 2019/039567 | A1 | 2/2019 |
| WO | 2019/147098 | A1 | 8/2019 |
| WO | WO 2020/175506 | A1 | 9/2020 |
| WO | WO 2021 /034020 | A1 | 2/2021 |

OTHER PUBLICATIONS

U.S. Final Office Action dated Nov. 30, 2023, issued in U.S. Appl. No. 18/158,274 (11 pages).
U.S. Final Office Action dated Sep. 7, 2023, issued in U.S. Appl. No. 17/170,364 (13 pages).
Chinese Office Action dated Mar. 19, 2020, with English translation, for corresponding Chinese Patent Application No. 201710595378.4 (16 pages).
Chinese Patent Office Action dated Mar. 26, 2020, with English Translation, for corresponding Chinese Patent Application No. 20170595368.0 (25 pages).
Chinese Office Action dated Jul. 3, 2020, with English translation, issued in corresponding Chinese Patent Application No. 201711293316.4 (18 pages).
Chinese Office Action, with English translation, dated Nov. 4, 2020, issued in corresponding Chinese Patent Application No. 201710595378.4 (18 pages).
Chinese Office Action dated Nov. 18, 2020, with English translation, issued in Chinese Patent Application No. 201710595368.0 (19 pages).
EPO Extended Search Report dated Nov. 14, 2017, for corresponding European Patent Application No. 17182400.6 (7 pages).
EPO Extended Search Report dated Dec. 4, 2017, for corresponding European Patent Application No. 17182408.9 (9 pages).
EPO Extended Search Report dated Mar. 29, 2018, for corresponding European Patent Application No. 17206091.5 (7 pages).
EPO Office Action dated Jun. 18, 2019, for corresponding European Patent Application No. 17 206 091.5, (4 pages).
EPO Third Party Observation dated Nov. 26, 2020, issued in European Patent Application No. 17182400.6 (11 pages).
EPO Search Report dated May 17, 2022, for corresponding European Patent Application No. 21210044.0 (8 pages).
Japanese Office Action dated Aug. 6, 2018, for corresponding Japanese Patent Application No. 2017-140741 (4 pages).
Japanese Office Action dated Jan. 11, 2019, for corresponding Japanese Patent Application No. 2017-236042 (4 pages).
Japanese Office Action dated Aug. 3, 2020, issued in corresponding Japanese Patent Application No. 2017-236042 (5 pages).
Japanese Office Action dated Aug. 31, 2020, issued in corresponding Japanese Patent Application No. 2019-163716 (6 pages).
Japanese Notice of Allowance dated Nov. 24, 2020, issued in Japanese Patent Application No. 2017-236042 (3 pages).
Japanese Office Action dated Jul. 5, 2021, issued in Japanese Patent Application No. 2019-163717 (6 pages).
Japanese Office Action dated Jan. 16, 2023, with English translation, issued in Japanese Patent Application No. 2021-205991 (6 pages).
Korean Office Action dated Dec. 9, 2019, issued in corresponding Korean Patent Application No. 10-2017-0167526 (98 pages).
Korean Office Action mailed Feb. 3, 2022, in corresponding Korean Patent Application No. 10-2020-0142522 (8 pages).
SPO Office Action dated Jun. 23, 2020, issued in European Patent Application No. 17182400.6 (6 pages).
U.S. Restriction Requirement dated Feb. 25, 2019, issued in U.S. Appl. No. 15/654,648 (7 pages).
U.S. Office Action dated Apr. 30, 2019, issued in U.S. Appl. No. 15/654,648 (17 pages).
U.S. Restriction Requirement dated Sep. 23, 2019, issued in U.S. Appl. No. 15/836,311 (7 pages).
U.S. Notice of Allowance dated Nov. 4, 2019, issued in U.S. Appl. No. 15/654,648 (10 pages).
U.S. Office Action dated Nov. 29, 2019, issued in U.S. Appl. No. 15/836,311 (9 pages).
U.S. Notice of Allowance dated Mar. 10, 2020, issued in U.S. Appl. No. 15/654,648 (8 pages).
U.S. Final Office Action dated Jun. 12, 2020, issued in U.S. Appl. No. 15/836,311 (9 pages).
U.S. Notice of Allowance dated Aug. 26, 2020, issued in U.S. Appl. No. 15/836,311 (9 pages).
U.S. Notice of Allowance dated Sep. 24, 2020, issued in U.S. Appl. No. 15/654,648 (8 pages).
U.S. Notice of Allowance dated Dec. 3, 2020, issued in U.S. Appl. No. 15/836,311 (8 pages).
U.S. Notice of Allowance dated Jan. 14, 2021, issued in U.S. Appl. No. 15/654,648 (8 pages).
U.S. Notice of Allowance dated Mar. 12, 2021, issued in U.S. Appl. No. 15/836,311 (13 pages).
U.S. Notice of Allowance dated Apr. 28, 2021, issued in U.S. Appl. No. 15/654,648 (8 pages).
U.S. Notice of Allowance dated Jun. 24, 2021, issued in U.S. Appl. No. 15/836,311 (8 pages).
U.S. Notice of Allowance dated Aug. 6, 2021, issued in U.S. Appl. No. 15/654,648 (8 pages).
U.S. Notice of Allowance dated Aug. 24, 2021, issued in U.S. Appl. No. 15/836,311 (8 pages).
U.S. Notice of Allowance dated Dec. 6, 2021, issued in U.S. Appl. No. 15/654,648 (8 pages).
U.S. Notice of Allowance dated Dec. 9, 2021, issued in U.S. Appl. No. 15/836,311 (8 pages).
U.S. Notice of Allowance dated May 20, 2022, issued in U.S. Appl. No. 17/183,295 (11 pages).
U.S. Office Action dated Jul. 8, 2022, issued in U.S. Appl. No. 17/308,940 (17 pages).
U.S. Restriction Requirement dated Sep. 14, 2022, issued in U.S. Appl. No. 17/170,364 (6 pages).
U.S. Final Office Action dated Jan. 30, 2023, issued in U.S. Appl. No. 17/308,940 (10 pages).
U.S. Office Action dated Feb. 28, 2023, issued in U.S. Appl. No. 17/170,364 (14 pages).
Kim et al., "A New Coating Method for Alleviating Surface Degradation of $LiNi_{0.6}CO_{0.2}Mn_{0.2}O_2$ Cathode Material: Nanoscale Surface Treatment of Primary Particles," Nano Letters, Feb. 2015, pp. 2111-2119, DOI: 10.1021/acs.nanolett.5b00045.
Lee, Yongho, et al., "Facile formation of a Li3PO4 coating layer during synthesis of a lithium-rich layered oxide for riigh-capacity lithium ion batteries," Journal of Power Sources, vol. 315, 2016, pp. 284-293.
Lim et al., "Advanced Concentration Gradient Cathode Material with Two-Slope for High-Energy and Safe Lithium Batteries," Advanced Functional Materials, 2015, vol. 25, pp. 4673-4680.
Noh, Hyung-Joo et al., "Cathode Material with Nanorod Structure-An Application for Advanced High-Energy and Safe Lithium Batteries," Chemistry of Materials, 2013, vol. 25, pp. 2109-2115.
Park, Kang-Joon et al. "Improved Cycling Stability of $Li[Ni_{0.90}CO_{0.05}Mn_{0.05}]O_2$ Through Microstructure Modification by Boron Doping for Li-Ion Batteries," Advanced Energy Materials, 2018, 9 pages.
Yan, Pengfei, et al., "Tailoring of Grain Boundary Structure and Chemistry of Cathode Particles for Enhanced Cycle Stability of Lithium Ion Battery," 2018, 22 pages.
Zhang, Xu-Dong, et al., "An effective LiBO2 coating to ameliorate the cathode/electrolyte interfacial issues of LiNi0.6Co0.2Mn0.2O2 in solid-state Li batteries," Journal of Power Sources, vol. 426, 2019, pp. 242-249.

(56) References Cited

OTHER PUBLICATIONS

Zheng, Zhuo et al., "Uniform Ni-rich $LiNi_{0.6}CO_{0.2}Mn_{0.2}O_2$ Porous Microspheres: Facile Designed Synthesis and Their Improved Electrocheminal Performance," Electrochimica Acta, vol. 191, 2016, pp. 401-410.
U.S. Office Action dated Jun. 21, 2023, issued in U.S. Appl. No. 18/158,274 (10 pages).
U.S. Final Office Action for U.S. Appl. No. 17/170,364, dated Mar. 27, 2024, 15 pages.
U.S. Final Office Action for U.S. Appl. No. 17/170,364, dated Mar. 21, 2025, 12 pages.
U.S. Final Office Action for U.S. Appl. No. 17/521,709, dated Mar. 20, 2025, 21 pages.
U.S. Final Office Action for U.S. Appl. No. 18/158,274, dated Aug. 28, 2024, 11 pages.
U.S. Office Action for U.S. Appl. No. 17/170,364, dated Oct. 15, 2024, 12 pages.
U.S. Office Action for U.S. Appl. No. 17/521,709, dated Sep. 4, 2024, 20 pages.
U.S. Office Action for U.S. Appl. No. 18/158,274, dated Apr. 23, 2024, 11 pages.
U.S. Office Action for U.S. Appl. No. 18/158,274, dated Apr. 29, 2025, 11 pages.
U.S. Office Action dated Dec. 15, 2023, issued in U.S. Appl. No. 17/170,364 (11 pages).
Chinese Office Action corresponding to CN Application No. 202111405661.9, dated Jul. 29, 2025 (8 pages).
U.S. Office Action dated Aug. 25, 2025, issued in U.S. Appl. No. 17/521,709 (10 pages).
European Office Action corresponding to EP Application No. 17182408.9, dated Jul. 17, 2025 (4 pages).
U.S. Office Action dated Oct. 24, 2025, issued in U.S. Appl. No. 17/170,364 (13 pages).
Korean Office Action dated Nov. 7, 2025, issued in Korean Patent Application No. 10-2021-0097217 (5 pages).
Wang, Xi-min, et al., "Synthesis and Characteristics of Layered LiNi0.8Co0.1Mn0.1O2 Cathode Material for Lithium Rechargeable Batteries," The Chinese Journal of Process Engineering, vol. 7, No. 4, Aug. 2007, with English Abstract, 5 pages.
Chinese Notice of Allowance, with English translation, dated Mar. 9, 2026, issued in corresponding Chinese Patent Application No. 202111405661.9 (7 pages).
U.S. Final Office Action dated Mar. 27, 2026, issued in U.S. Appl. No. 17/170,364 (17 pages).
Korean Office Action dated Mar. 19, 2026, issued in corresponding Korean Patent Application No. 10-2021-0097217 1 (5 pages). .
European Office Action corresponding to EP Application No. 17182400.6 , dated Sep. 25, 2025 (6 pages).
US Ex Parte Quayle Action dated May 11, 2026, issued in U.S. Appl. No. 17/521,709 (6 pages).
US Notice of Allowance dated May 12, 2026, issued in U.S. Appl. No. 18/158,274 (8 pages).

* cited by examiner

PRIMARY PARTICLES OF NICKEL-BASED ACTIVE MATERIAL
13
PLANE
t
R
10
14
12
[PRECURSOR]
LiOH $H_2O$ + $Me(OH)_2$
$H_2O$, $CO_2$
NICKEL-BASED ACTIVE MATERIAL INTERMEDIATE
SECONDARY PARTICLES OF NICKEL-BASED ACTIVE MATERIAL

NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

CROSS-REFERENCE TO RELATED APPLICATIONS

This application is a continuation of U.S. patent application Ser. No. 18/158,274, filed Jan. 23, 2023, which is a continuation of U.S. patent application Ser. No. 15/654,623, filed Jul. 19, 2017, now U.S. Pat. No. 11,569,503, issued on Jan. 31, 2023, which claims priority to and the benefit of Korean Patent Application Nos. 10-2016-0092244, filed on Jul. 20, 2016, and 10-2016-0162292, filed on Nov. 30, 2016, in the Korean Intellectual Property Office the entire content of all of which is incorporated herein by reference.

BACKGROUND

1. Field

One or more aspects of embodiments of the present disclosure relate to a nickel-based active material for a lithium secondary battery, a method of preparing the same, and a lithium secondary battery including a positive electrode including the nickel-based active material.

2. Description of the Related Art

As portable electronic devices and communication devices are developed, there is a high need for development of a lithium secondary battery having a high energy density.

A lithium nickel manganese cobalt composite oxide, a lithium cobalt oxide, or the like may be used as a positive active material in a lithium secondary battery. However, when such a positive active material is used, the lifespan of a lithium secondary battery may be reduced due to generation of cracks in primary active material particles as charge/discharge cycles are repeated. As a result, battery resistance may increase and battery capacity characteristics may not be satisfactory. Therefore, improvements in positive active materials are desirable.

SUMMARY

One or more aspects of embodiments of the present disclosure are directed toward a nickel-based active material for a lithium secondary battery and a method of preparing the nickel-based active material, the lithium secondary battery having an improved lifespan and reduced battery resistance due to suppression or reduction of crack formation during charge/discharge cycling.

One or more aspects of embodiments of the present disclosure are directed toward a lithium secondary battery including a positive electrode including the nickel-based active material, the lithium secondary battery exhibiting improved cell performance.

Additional aspects will be set forth in part in the description which follows and, in part, will be apparent from the description, or may be learned by practice of the presented embodiments.

One or more example embodiments of the present disclosure provide a nickel-based active material for a lithium secondary battery including a secondary particle having an outer portion with a radially arranged structure and an inner portion with an irregular porous structure, wherein the inner portion of the secondary particle has a larger pore size than the outer portion of the secondary particle.

One or more example embodiments of the present disclosure provide a method of preparing the nickel-based active material for the lithium secondary battery including: performing a first heat treatment on a mixture of a lithium precursor and a metal hydroxide at a temperature of about 600° C. to about 800° C. in an oxidative gas atmosphere.

In some embodiments, the method may further include, after the performing of the first heat treatment, performing a second heat treatment on the mixture at a temperature of about 700° C. to about 900° C. in an oxidative gas atmosphere, wherein the second heat treatment is performed at a higher temperature than the first heat treatment.

One or more example embodiments of the present disclosure provide a lithium secondary battery including: a positive electrode including the nickel-based active material, a negative electrode, and an electrolyte between the positive electrode and the negative electrode.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1A:
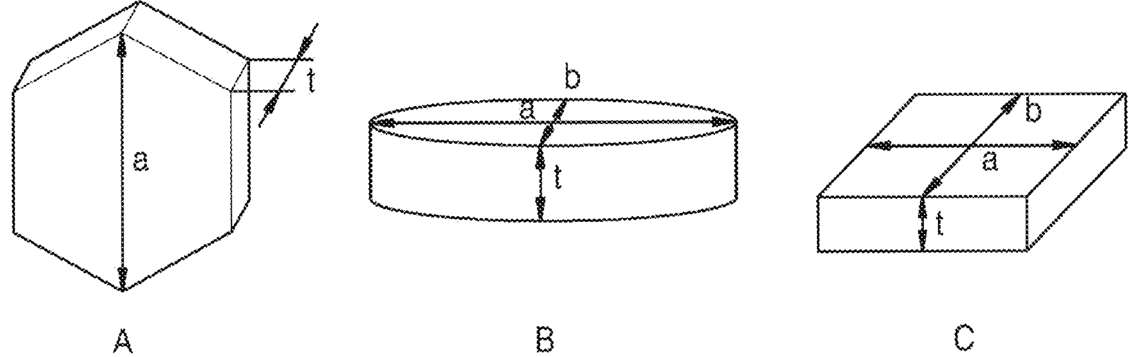
FIG. 1A is a schematic view showing plate particle shapes (A), (B), and (C)

Reference will now be made in more detail to embodiments, examples of which are illustrated with respect to a nickel-based active material for a lithium secondary battery, a method of preparing the nickel-based active material, a positive electrode including the nickel-based active material, and a lithium secondary battery including the positive electrode in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of", "one of", "selected from", "at least one selected from", and "one selected from" when preceding a list of elements, modify the entire list of elements and do not modify the individual elements of the list.

One or more aspects of embodiments of the present disclosure provides a nickel-based active material for a lithium secondary battery, the nickel-based active material including a secondary particle having an outer portion including a plurality of primary particles arranged in a radial structure, and an inner portion having an irregular porous structure, wherein the inner portion of the secondary particle has a larger pore size than the outer portion of the secondary particle. The term "primary particle" is used herein in its art-recognized sense to refer to the smallest particle type or form that can be identified in a material. The term "secondary particle" is used herein in its art-recognized sense to refer to the next smallest particle type or form, which is formed as an assembly or an agglomerate of two or more primary particles. The term "active material" used herein refers to a battery material having a particular composition and crystal structure that renders it suitable for intercalating and deintercalating lithium ions. The terms "primary particle" and "secondary particle" may be used to describe the term "active material" to refer to the physical morphology of a sample of the active material.

Here, a particle size of the primary particles constituting the secondary particle may be small enough to improve (e.g., have a size suitable for improving) the characteristics of the nickel-based active material.

In some embodiments, the inner portion of the secondary particle of the nickel-based active material (e.g., nickel-based active material secondary particles) for the lithium secondary battery has a larger pore size than the outer portion.

In some embodiments, a pore size in the inner portion of the secondary particle may be about 150 nm to about 1 μm, for example, about 150 nm to about 550 nm, or about 200 nm to about 500 nm, and a pore size in the outer portion of the secondary particle may be less than about 150 nm, for example, less than or equal to about 100 nm, or about 20 nm to about 90 nm. As such, the pore size in the inner portion of the secondary particle may be larger than the pore size in the outer portion of the secondary particle. Accordingly, a distance for lithium diffusion (e.g., during intercalation and deintercalation) may be advantageously shortened in the secondary particle of the same size (i.e. compared to a secondary particle of comparable overall size without the described pore sizes), and volume changes occurring during charge/discharge cycling may be also alleviated or reduced because pores are not exposed to an electrolyte.

The terms "size of pores" or "pore size" as used herein refer to an average diameter of a pore in the case where the pore is spherical or circular. When the pore is elliptical or has a non-spherical or circular shape, the "size of the pore" or "pore size" refers to a length of a long axis of the pore (e.g., the longest aperture length of the pore). The pore size may be measured by a BET method.

In some embodiments, the nickel-based active material may include a plate particle having a long axis arranged in a radial direction (e.g., positioned so that the longest axis of the particle points in a radial direction). Here, a plane to which lithium may be accessible (e.g., a plane perpendicular to a (001) plane) (e.g., the (100) or (010) planes) may be exposed at a surface of the secondary particle of the nickel-based active material.

The terms "plate particle" and "plate-type particle" as used herein refer to a particle shape, including a particle having a thickness that is smaller than a length of a long axis (in a plane direction). Here, the term "length of the long axis" refers to a maximum length on the widest plane (e.g., longest planar dimension) of the plate particle.

For example, the term "plate particle" may refer to a particle structure in which a length tin one axial direction (i.e., a thickness direction) is shorter than a length of a long axis a in a direction perpendicular to the one axial direction (i.e., a plane direction).

FIGS. 1A(A) to 1A(C) are schematic views illustrating three example plate particle shapes according to embodiments of the present disclosure.

Referring to FIGS. 1A(A) to 1A(C), the plate particle may have a polygonal nanoplate shape similar to that of a hexagon (FIG. 1A(A)), a nanodisc (e.g., cylindrical) shape (FIG. 1A(B)), or a rectangular parallelepiped shape (FIG. 1A(C)).

In FIGS. 1A(A) to 1A(C), a thickness t of the plate particle is smaller than a length a and/or b in a direction along the plane on the plate particle. Here, the length a in a direction along the plane may be longer than or equal to the length b in a direction along the plane. In FIG. 1A, the direction labeled with the thickness t is defined as a thickness direction, and the directions labeled with the length a and/or b are defined as directions along the plane ("plane directions").

Figure 1B:
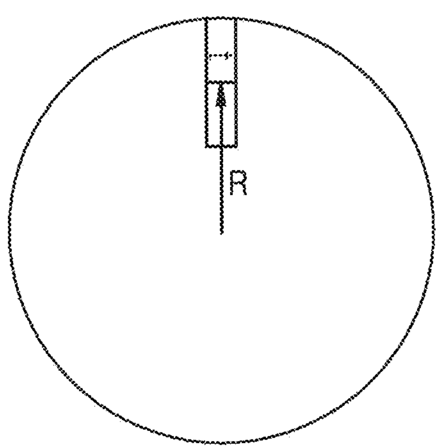
FIG. 1B is a diagram explaining the terms "radial arrangement" and "radial-type" as used to describe a secondary particle of a nickel-based active material according to an embodiment of the present disclosure.

The terms "radial arrangement", "radial structure", or "radial-type" as used herein refer to an arrangement shown in FIG. 1B, in which a plate particle is positioned so that a thickness direction t (i.e., the [001] plane direction) of the plate particle is perpendicular to a direction (vector) R radiating from the center of the secondary particle.

In some embodiments, the inner portion of the secondary particle of the nickel-based active material has an irregular porous structure. The term "irregular porous structure" as used herein refers to a structure in which pores are not substantially consistent in size and/or shape and have no or substantially no uniformity. The inner portion of the nickel-based active material having such an irregular porous structure may also include the plate particle in the same or substantially the same manner as in the outer portion of the nickel-based active material. However, unlike the radially arranged structure of the plate particles in the outer portion of the nickel-based active material, the plate particles included in the inner portion of the nickel-based active material may have a structure having no regularity (e.g., may not be aligned).

The term "outer portion" as used herein refers to an area corresponding to 30% to 50% (for example, 35% to 45%, or in some embodiments 40%) of a length extending from an outer surface toward the center of the particle, with respect to the total radial distance between the center and a surface of the secondary particle of the nickel-based active material, or the area within 2 μm of the outermost periphery of the secondary particle of the nickel-based active material. The term "inner portion" as used herein refers to an area occupying 50% to 70% (for example, 55% to 65%, or in some embodiments 60%) of a length extending from the center toward the outer surface of the secondary particle, with respect to the total radial distance between the center and a surface of the secondary particle of the nickel-based active material, or the area outside the area within 2 μm of the outermost periphery of the secondary particle of the nickel-based active material.

The secondary particle of the nickel-based active material may have an open pore having a size (e.g., diameter) of less than about 150 nm, for example, a size of about 25 nm to about 148 nm, toward the center of the inner portion of the secondary particle. Here, the term "open pore" refers to an exposed pore through which electrolyte may flow. In some embodiments, the open pore may be formed to an average depth of about 150 nm or less (for example, a depth of about 0.001 nm to about 100 nm, or about 1 nm to about 50 nm) from the surface of the secondary particle of the nickel-based active material.

In some embodiments, the nickel-based active material may include the plate particle having a long axis arranged in a radial direction (e.g., positioned so that the longest axis of the particle points in a radial direction).

In some embodiments, an average length of the plate particles forming the outer portion and the inner portion of the secondary particle of the nickel-based active material may be about 150 nm to about 500 nm, for example, about 200 nm to about 380 nm, or about 290 nm to about 360 nm. Here, the term "average length of the plate particles" refers to an average length in the plane direction of the plate particle (e.g., the average of the long and short axes of the plate particles).

In some embodiments, an average thickness of the primary plate particles forming the outer portion and the inner portion of the secondary particle of the nickel-based active material may be about 100 nm to about 200 nm, for example, about 120 nm to about 180 nm, or about 130 nm to about 150 nm. Here, a ratio of the average thickness to the average length of the plate particle may be about 1:2 to about 1:5, for example, about 1:2.1 to about 1:5, or about 1:2.3 to about 1:2.9. The average length, the average thickness, and the ratio of the average thickness to the average length of the plate particles may be determined using SEM. When the average length, the average thickness, and the ratio of the average thickness to the average length of the plate particles are within the ranges above, the size of the plate particles is small, and the primary particles are arranged radially in the outer portion of the secondary particle of the nickel-based active material, a relatively large number of lithium diffusion paths between grain boundaries may be exposed at the surface of the secondary particle of the nickel-based active material, and many crystal surfaces capable of mediating lithium transfer to the outer portion of the secondary particle of the nickel-based active material may be exposed, thereby enhancing the rate of lithium diffusion such that high initial efficiency and capacity may be achieved in a lithium secondary battery including the nickel-based active material. In addition, when the plate-type primary particles are arranged radially, surface pores formed between the plate-type primary particles may be directed toward the center direction, thereby promoting lithium diffusion between the surface and center of the secondary particles. The radial arrangement of the plate-type primary particles may enable or support consistent shrinkage and expansion during intercalation and deintercalation of lithium. In addition, pores that exist parallel to the (001) planes may provide a buffering action against particles expansion during intercalation of lithium between those planes. When the size of the plate-type primary particles is small, the probability of crack formation during shrinkage and/or expansion may be lowered, and furthermore, pores in the inner portion of the secondary particles may mitigate a volume change, thereby reducing crack formation between the plate-type primary particles during charge/discharge cycling. Accordingly, the lifespan of the lithium secondary battery may be improved and the amount of resistance increase over cycling may be reduced.

In some embodiments, a pore size (e.g., diameter) in the inner portion of the nickel-based active material may be about 150 nm to about 550 nm, and a pore size in the outer portion of the nickel-based active material may be less than about 150 nm. The inner portion of the nickel-based active material may include a closed pore, whereas the outer portion of the nickel-based active material may include a closed pore and/or an open pore. The term "closed pore" as used herein refers to an independently formed pore in which all the walls of the pore are closed so as to provide no connection to other pores, while the term "open pore" refers to a pore having an opening in at least a part of the pore walls, thereby providing a continuous connection to the outside of the particle. A closed pore may not contain electrolyte therein, whereas an open pore may contain an electrolyte therein.

In some embodiments, the secondary particle of the nickel-based active material may have an open pore having a size of less than about 150 nm toward the center of the inner portion of the secondary particle.

In some embodiments, the nickel-based active material may be an active material represented by Formula 1:

$$Li_a(Ni_{1-x-y-z}Co_xMn_yM_z)O_2 \quad \text{Formula 1}$$

In Formula 1, M may be an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and a, x, y, and z may satisfy the following relations:

$0.95 \le a \le 1.3$, $x \le (1-x-y-z)$, $y \le (1-x-y-z)$, $z \le (1-x-y-z)$, $0<x<1$, $0 \le y<1$, and $0 \le z<1$.

As such, in the nickel-based active material of Formula 1, an amount of nickel (Ni) is greater than that of cobalt (Co) and manganese (Mn).

In Formula 1, a, x, y, and z may satisfy the following relations: $0.95 \le a \le 1.3$, for example, $1.0 \le a \le 1.1$; $0<x \le 0.33$, for example, $0.1 \le x \le 0.33$; $0 \le y \le 0.5$, for example, $0.05 \le y \le 0.3$, $0 \le z \le 0.05$; and $0.33 \le (1-x-y-z) \le 0.95$. For example, in Formula 1, $0.33 \le (1-x-y-z) \le 0.95$.

In some embodiments, in Formula 1, a, x, y, and z satisfy the following relations: $0.95 \le a \le 1.3$, $0 \le z \le 0.05$, $0<x \le 0.33$, and $0 \le y \le 0.33$.

In some embodiments, in Formula 1, z may be 0.

In some embodiments, in Formula 1, M may be Al in the case of $0<z \le 0.05$.

The amount of Ni in the nickel-based active material may be about 33 mol % to about 95 mol % based on the total amount of transition metals including Ni, Co, and Mn, and the amount of Ni in the nickel-based active material may be higher than the amount of Mn. The amount of Ni in the nickel-based active material may be higher than the amount of Co.

The amount of Ni in the nickel-based active material may be greater than that of other transition metals, based on 1 mole of total transition metals. When a nickel-based active material having a large amount of Ni is used as described above for a positive electrode to be included in a lithium secondary battery, the lithium secondary battery may have high rate of lithium diffusion, good conductivity, and high capacity at the same voltage. However, the lifespan of the lithium secondary battery may be degraded due to crack formation.

The nickel-based active material may be $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

The nickel-based active material may have an overall porosity of about 1% to about 8%, for example, about 1.5% to about 7.3% (e.g., of the total volume of solids and voids). In the nickel-based active material, the porosity of the outer portion of the nickel-based active material may be smaller than that of the inner portion of the nickel-based active material. Pores at the surface of the particle may face toward the center of the particle. When viewed from the surface, the average pore size may be less than about 150 nm, for example, about 10 nm to about 100 nm. The porosity of the inner portion of the secondary particle of the nickel-based active material may be about 2% to about 20%, and the closed porosity in the outer portion of the secondary particle of the nickel-based active material may be about 0.1% to about 2%. The term "closed porosity" used herein refers to a fraction of closed pores (pores through which an electrolyte cannot penetrate) relative to a volume of total pores.

In the present specification, the terms "porosity" and "porosity fraction" are interchangeably used to refer to the ratio of an area (e.g., volume) occupied by pores to a total area (e.g., volume) of the pores and solid material.

In some embodiments, the porosity (porosity fraction) in the inner portion of the nickel-based active material may be about 3.3% to about 16.5%, and the porosity (porosity fraction) in the outer portion of the nickel-based active material may be about 0.3% to about 0.7%.

Figure 1C:
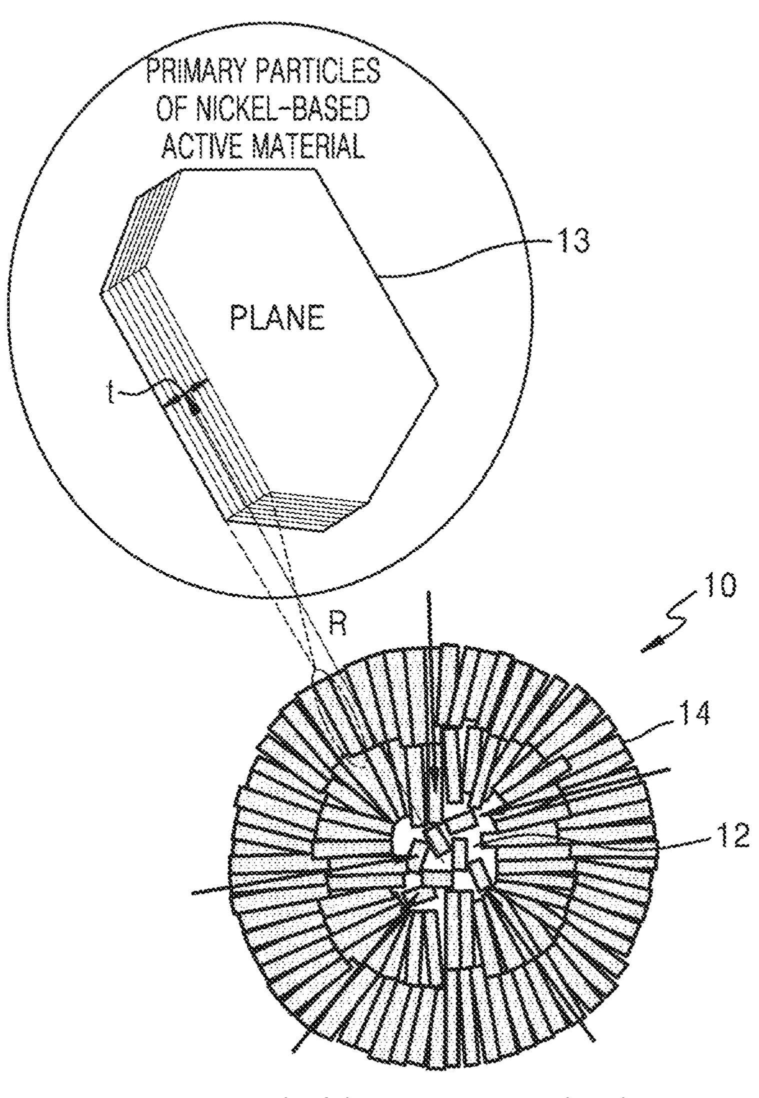
FIG. 1C is a cross-sectional schematic view of a secondary particle of a nickel-based active material for a lithium secondary battery according to an embodiment of the present disclosure, including an inset showing a perspective view of a single plate-shaped primary particle.

FIG. 1C is a cross-sectional view of the nickel-based active material according to an embodiment of the present disclosure.

Referring to FIG. 1C, a secondary particle of the nickel-based active material includes an outer portion 14 having a structure in which a plate particle 13 is arranged in a radial direction, and an inner portion 12 in which the plate particle 13 is irregularly arranged. The inner portion 12 of the secondary particle of the nickel-based active material 10 includes more void spaces between the plate particles 13 compared to the outer portion 14 of the nickel-based active material 10. The inset of FIG. 1C shows a perspective view of a one of the plate-shaped primary particles that aggregate to form the secondary particle of the nickel-based active material. In some embodiments, the size and porosity of pores in the inner portion 12 of the nickel-based active material 10 are larger and more irregular compared to those in the outer portion 14 of the nickel-based active material 10. In FIG. 1C, the single-headed arrows indicate the movement of $Li^+$ ions.

As described above, the nickel-based active material according to an embodiment of the present disclosure may include radial-type plate particles to assist lithium diffusion, suppress or reduce volume-dependent stress during charge/discharge cycling, and inhibit crack formation. In some embodiments, such radial-type plate particles may reduce the formation of a surface resistive layer during manufacture, while lithium diffusion path (e.g., one or more lithium diffusion pathways) may be exposed to the surface of the nickel-based active material to thereby increase an active surface area necessary for the lithium diffusion. In some embodiments, the outer portion of the nickel-based active material may include a plate particle having a long (e.g., elongated) radial shape, while the inner portion of the nickel-based active material may include a plate particle having a shorter shape (for example, about 150 nm to about 200 nm), such as a nanodisc-shaped particle.

In some embodiments, the nickel-based active material may include radial type (radially arranged) plate particles and non-radial type (non-radially arranged) plate particles. Here, the amount of the non-radial type plate particles may be 20 weight % or less, for example, about 0.01 weight % to about 10 weight % or about 0.1 weight % to about 5 weight %, based on the total weight of the radial type plate particles and the non-radial type plate particles. In the nickel-based active material, when the non-radial type plate particles are included in the amount ranges described above, lithium may be easily diffused so that a lithium secondary battery having improved lifespan characteristics may be manufactured.

Figure 1D:
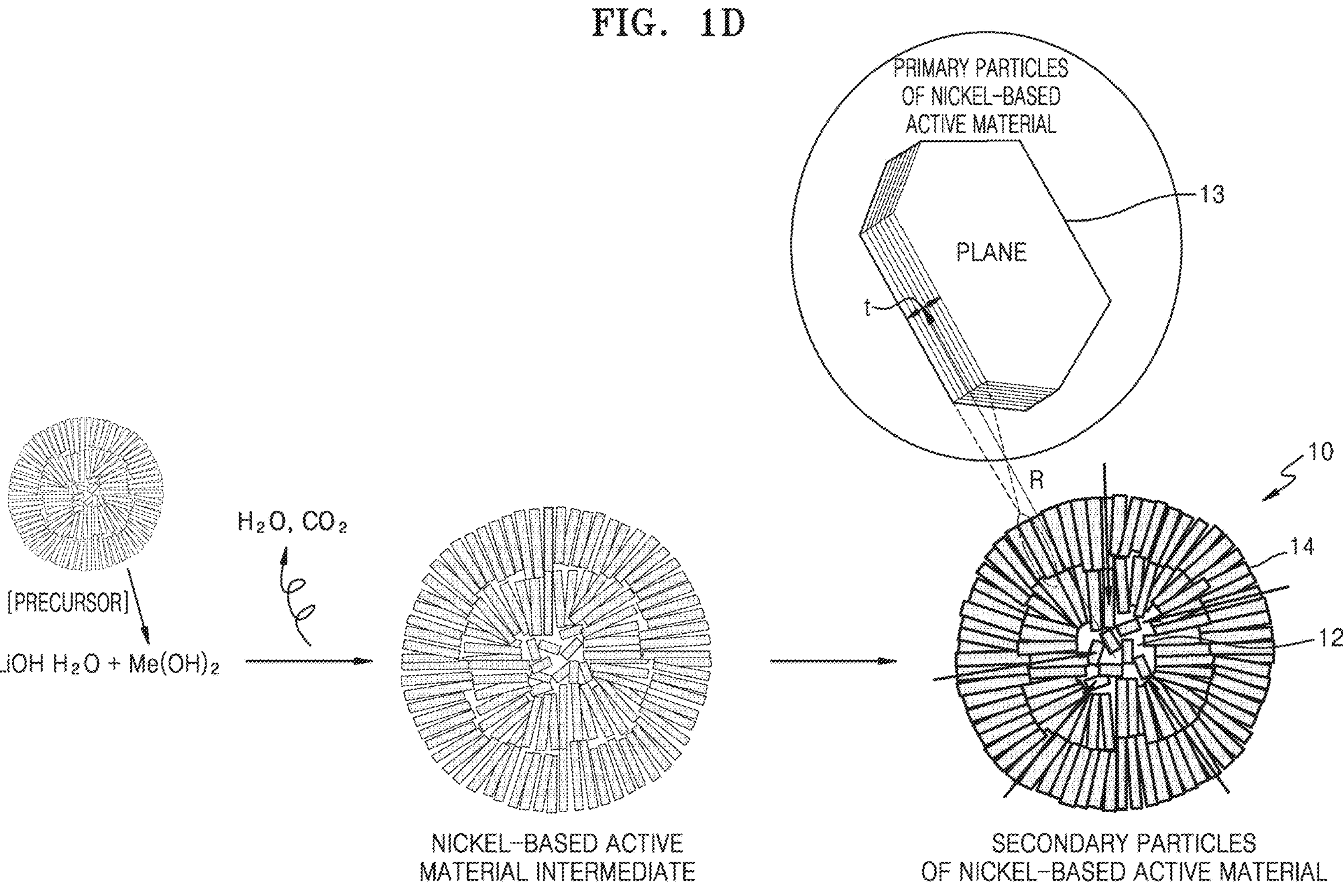
FIG. 1D is a diagram showing a process of preparing a nickel-based active material according to an embodiment of the present disclosure.

A method of preparing the nickel-based active material according to an embodiment of the present disclosure will be described with reference to FIG. 1D. In FIG. 1D, $LiOH \cdot H_2O$ is used as an example lithium precursor, and $Me(OH)_2$ is used as the metal hydroxide, where Me includes nickel, cobalt, manganese, and M of Formula 1.

According to the method, a lithium precursor and a metal hydroxide are mixed at a constant molar ratio, and a first heat treatment (low-temperature heat treatment, low-temperature calcination) is performed on the mixture under an oxidative gas atmosphere at a temperature of about 600° C. to about 800° C., thereby preparing a nickel-based active material.

The metal hydroxide may be a compound represented by Formula 2:

$$Ni_{1-x-y-z}CO_xMn_yM_z)(OH)_2. \quad \text{Formula 2}$$

In Formula 2, M may be an element selected from B, Mg, Ca, Sr, Ba, Ti, V, Cr, Fe, Cu, Zr, and Al, and x, y, and z may satisfy the following relations: $x \le (1-x-y-z)$, $y \le (1-x-y-z)$, $z \le (1-x-y-z)$, $0<x<1$, $0 \le y<1$, and $0 \le z<1$.

In Formula 2, x, y, and z may satisfy $0<x \le 0.33$, $0 \le y \le 0.5$, $0 \le z \le 0.05$, and $0.33 \le (1-x-y-z) \le 0.95$.

In Formula 2, the metal hydroxide may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.5}Co_{0.1}Mn_{0.1}(OH)_2$, or $Ni_{0.85}Co_{0.1}Al_{0.05}(OH)_2$.

The lithium precursor may be, for example, lithium hydroxide, lithium fluoride, lithium carbonate, or a mixture thereof. The ratio at which the lithium precursor and the metal hydroxide are mixed may be stoichiometrically adjusted to prepare the active material of Formula 1.

Here, the mixing may be dry mixing, or may be performed using a mixer or the like.

The dry mixing may be performed according to a milling method. Here, with respect to milling conditions, the dry mixing may be performed in a way that metal hydroxide used as a starting material barely undergoes deformation such as micronization. In this regard, the average size of the lithium precursor particles that are to be mixed with the metal hydroxide may be controlled. In some embodiments, the size (average particle diameter) of the lithium precursor may be about 5 μm to about 20 μm, for example, about 8 μm to about 16 μm, or about 10 μm. As used herein, the term "average particle diameter" may refer to D50 of the particles. The D50 may be measured by a particle size analyzer (USA).

When the lithium precursor having an average particle size within the range above is subjected to a milling process with the metal hydroxide at a rate of about 300 rpm to about 3,000 rpm, a desired nickel-based active material may be obtained.

When a temperature inside the mixer rises to about 30° C. or higher during the milling process described above, a cooling process may be performed to maintain the temperature inside the mixer within the room temperature (25° C.) range.

The average size of the metal hydroxide particles may be almost or substantially identical to that of the nickel-based active material. In some embodiments, a composite metal hydroxide may have, for example, an average thickness of about 100 nm to about 250 nm, an average length of about 250 nm to about 1,100 nm, an internal pore size of about 150 nm to about 1 μm, for example, about 150 nm to about 550 nm, and an external pore size of about 50 nm to about 148 nm.

A low-temperature heat treatment may be performed under an atmosphere including an oxidative gas. The oxidative gas may include, for example, oxygen or air. The oxidative gas may include oxygen or air at about 10 volume % to about 20 volume % and inert gas at about 80 volume % to about 90 volume %.

The low-temperature heat treatment may be appropriately performed at the densification temperature or lower as the reaction between the lithium precursor and the metal hydroxide proceeds. Here, the term "densification temperature" refers to the temperature at which crystallization occurs to a sufficient degree so as to promote an increase in charging capacity of the active material.

The low-temperature heat treatment may be performed, for example, at a temperature of about 600° C. to about 800° C., or about 650° C. to about 800° C. Here, the rate of temperature rise during the low-temperature heat treatment may be about 1° C./minute to about 5° C./minute, and for example, may be about 3° C./minute.

The time for the low-temperature heat treatment may be selected according to the temperature at which the low-temperature heat treatment is performed. The low-temperature heat treatment may be performed at 650 to 800° C. for about 3 hours to about 10 hours. The treatment time may be varied with the temperature. For example, if the low temperature heat treatment is performed at 800° C., the heat treatment time may be about 3 hours. As another example, if the low temperature heat treatment is performed at 650° C., the heat treatment time may be about 10 hours.

When the heat treatment is performed under the conditions described above, secondary particles of a nickel-based active material having an outer portion with a radially arranged structure and an inner portion with an irregularly porous structure may be prepared. Here, an average particle diameter of plate-type primary particles constituting the secondary particles of the nickel-based active material may be about 100 nm to about 250 nm in a short axis direction. Accordingly, the stress caused by changes in volume during a charge/discharge process may be suppressed.

The secondary particles of the nickel-based active material may be subjected to a second heat treatment (high-temperature heat treatment, high-temperature calcination) under an oxidative gas atmosphere when an exhaust of the secondary particles is suppressed (e.g., when the process of removing air inside the reactor for producing the nickel-based active material is suppressed).

When the exhaust of the secondary particles of the nickel-based active material is suppressed during manufacturing, the generation of a surface resistive layer may be maximally suppressed or reduced by maintaining the atmosphere inside a reactor, and particle densification may be achieved.

The high-temperature heat treatment may be performed at a temperature of about 700° C. to about 900° C. Here, the rate of temperature rise during the high-temperature heat treatment may be about 1° C./minute to about 5° C./minute, and for example, may be about 3° C./minute. The time for the high-temperature heat treatment may be selected according to the temperature at which the high-temperature heat treatment is performed. For example, the high-temperature heat treatment may be performed for about 3 hours to about 10 hours.

Accordingly, an average particle diameter of the secondary particle of the nickel-based active material may be about 2 μm to about 18 μm, for example, about 3 μm to about 12 μm, for example, about 8 μm to about 10 μm, or for example, about 9 μm. As used herein, the term "average particle diameter" may refer to D50 of the particles. The D50 may be measured by a particle size analyzer (USA).

When an active material is discharged, the diffusion rate of lithium decreases at the end of a discharge process (e.g., as the open circuit voltage decreases). In addition, when the average size of the secondary particles of the nickel-based active material is large, permeation of lithium into active material may decrease due to increased resistance. As a result, the charge/discharge efficiency may be lowered (e.g., the discharge capacity is decreased compared to the charge capacity). However, when the inner portion of the secondary particle of the nickel-based active material has a porous structure, the diffusion distance to the inner portion may be effectively reduced. When the outer portion of the secondary particle of the nickel-based active material has a radial arrangement, intercalation of lithium into the particle may be better facilitated. In addition, when the nickel-based active material primary particles are small, a lithium diffusion path between crystal grains may be easily ensured. When the primary particles are small and pores between the primary particles are available to alleviate volume changes caused during charge/discharge cycling, stress caused by the volume changes during charge/discharge cycling may be minimized.

When the nickel-based positive active material particle according to embodiments of the present disclosure is cut into cross-sections, a volumetric ratio of an inner portion to an outer portion of a cross section may be examined. The area (e.g., portion of the particle) located within about 60% from the center may be defined as the inner portion, and the inner portion may contain about 20 volume % to about 35 volume % (for example, about 22%) of the total volume of the nickel-based active positive material. When defining an inner portion and an outer portion, the inner portion and the outer portion may be distinguished by an area ratio instead of a volume.

In some embodiments, a c-plane (e.g., 001 plane) of the primary particle of the nickel-based active material may be arranged in a radial direction.

In some embodiments, the nickel-based active material improves the lithium diffusion degree during charge/discharge cycling, and in this regard, the nickel-based active material is a positive active material having a high charge/discharge efficiency and a high initial capacity.

In some embodiments, a method of preparing a metal hydroxide that is porous and has a plate particle shape is described as follows. The method of preparing the metal hydroxide is not particularly limited, and for example, may be performed according to a co-precipitation method or a solid phase method. Hereinafter, as an example, the metal hydroxide compound of Formula 2 is prepared using a co-precipitation method.

A raw material for the nickel-based active material, such as a Ni precursor, a Co precursor, a Mn precursor, and a metal M precursor, is mixed with a solvent to obtain a precursor mixture.

The amounts of the Ni precursor, the Co precursor, the Mn precursor, and the metal M precursor may be stoichiometrically adjusted to prepare the compound of Formula 2.

The solvent may include water, ethanol, propanol, and/or butanol.

A precipitator and a pH regulator may be added to the precursor mixture to control the pH of the resulting mixture. A co-precipitation method is performed on the resulting mixture to obtain a precipitate product. Here, the pH of the mixture is adjusted to pH 10 to pH 13.

The precipitates obtained therefrom are subjected to filtration and heat treatment. The heat treatment may be performed at a temperature of about 20° C. to about 160° C. to dry the precipitates.

The precipitator may control or regulate one or more precipitation reaction rates associated with the co-precipitation reaction. Non-limiting examples thereof may include sodium hydroxide (NaOH), ammonium hydroxide ($NH_4OH$), and citric acid. The amount of the precipitator may be similar to that suitably used in the related art.

The pH regulator may control or regulate the pH of a reaction mixture. Non-limiting examples thereof may include ammonium hydroxide ($NH_4OH$), sodium hydroxide (NaOH), sodium carbonate ($Na_2CO_3$), and sodium oxalate ($Na_2C_2O_4$).

Non-limiting examples of the Ni precursor may include nickel sulfate, nickel chloride, or nickel nitrate. Non-limiting examples of the Co precursor may include cobalt sulfate, cobalt chloride, or cobalt nitrate. Non-limiting examples of the Mn precursor may include manganese sulfate, manganese nitrate, and manganese chloride. Non-limiting examples of the metal M precursor may include metal carbonate, metal sulfate, metal nitrate, and metal chloride.

Hereinafter, a method of preparing a lithium secondary battery including a positive electrode including the nickel-based active material according to an embodiment of the present disclosure, a negative electrode, a non-aqueous electrolyte containing a lithium salt, and a separator will be described.

A positive electrode and a negative electrode may be prepared by applying a composition for forming a positive active material layer on a first current collector, applying a composition for forming a negative active material layer on a second current collector, and then drying the materials on each current collector.

The composition for forming the positive active material layer may be prepared by mixing a positive active material, a conductive agent, a binder, and a solvent. In some embodiments, a lithium composite oxide represented by Formula 2 may be used as the positive active material.

The binder (which is a component that assists in binding between an active material layer and a current collector) may be added in an amount of about 1 part to about 50 parts by weight based on 100 parts by weight of the total weight of the composition for forming the positive active material layer. Non-limiting examples of the binder may include polyvinylidene fluoride (PVDF), polyvinyl alcohol (PVA), carboxymethyl cellulose (CMC), starch, hydroxypropyl cellulose, regenerated cellulose, polyvinylpyrrolidone, polytetrafluoroethylene, polyethylene, polypropylene, ethylenepropylene-diene terpolymer (EPDM), sulfonated EPDM, styrene butylene rubber (SBR), fluorine rubber, and various copolymers. Here, an amount of the binder may be about 2 part to about 5 parts by weight based on 100 parts by weight of the total weights of the positive active material layer. When the amount of the binder is within the range above, a satisfactory binding force of the positive active material layer to the current collector may be achieved.

Any conductive agent material may be used as long as it has electrical conductivity but does not cause a chemical change in a corresponding battery. Non-limiting examples of the conductive agent may include graphite (such as natural graphite and/or artificial graphite); a carbonaceous material (such as carbon black, acetylene black, Ketjenblack®, channel black, furnace black, lamp black, and/or summer black), a conductive fiber (such as carbon fiber and/or metal fiber), a fluorocarbon, a metal powder (such as aluminum powder and/or nickel powder, a conductive whisker (such as zinc oxide and/or potassium titanate); and a conductive polymer (such as a polyphenylene derivative).

In some embodiments, an amount of the conductive agent may be about 2 parts to about 5 parts by weight based on 100 parts by weight of the total weight of the composition for forming the positive active material layer. When the amount of the conductive agent is within the above-described range, the finished electrode may have excellent or suitable conductivity.

A non-limiting example of the solvent is N-methylpyrrolidone.

In some embodiments, an amount of the solvent may be about 1 parts to about 70 parts by weight, for example, about 1 to about 65 parts by weight based on 100 parts by weight of the total weight of the composition for forming the positive active material layer. When the amount of the solvent is within the above-described range, the positive active material layer may be easily formed.

The material used to form the positive current collector is not particularly limited as long as it has a thickness of about 3 μm to about 500 μm and has a high conductivity without causing a chemical change when incorporated in a battery. Non-limiting examples of the material used to form the positive current collector may include stainless steel, aluminum, nickel, titanium, heat treated carbon, and/or aluminum or stainless steel that is surface treated with carbon, nickel, titanium, and/or silver. The current collector may have a fine uneven structure (e.g., microstructure) at its surface to increase a binding force between the current collector and the positive active material. The current collector may have any suitable shape or form (such as a film, sheet, foil, net, porous, foam, and/or non-woven shape).

In a separate manner, the composition for forming the negative active material layer may be prepared by mixing a negative active material, the binder, the conductive agent, and the solvent.

Any material that allows lithium ions to intercalate thereinto or deintercalate therefrom may be used as the negative active material. Non-limiting examples of the negative active material may include graphite, a carbonaceous material (such as carbon), lithium metal, an alloy of lithium metal, and a silicon oxide-based material. In some embodiments, silicon oxide may be used as the negative active material.

An amount of the binder may be about 1 part to about 50 parts by weight based on 100 parts by weight of the total weight of the composition for forming the negative active material layer. Non-limiting examples of the binder may include the same as those described herein in connection with the positive electrode.

An amount of the conductive agent may be about 1 to about 5 parts by weight, based on 100 parts by weight of the total weight of the composition for forming the negative active material layer. When the amount of the conductive agent is within the range above, the finished negative electrode may have excellent conductivity.

An amount of the solvent may be about 1 to about 70 parts by weight, for example, about 1 to about 65 parts by weight based on 100 parts by weight of the total weight of the composition for forming the negative active material layer. When the amount of the solvent is within the range above, the negative active material layer may be easily formed.

The conductive agent and the solvent may each independently be the same as those described herein in connection with the positive electrode.

The negative current collector may have a thickness of about 3 μm to about 500 μm. Any material may be used to form the negative current collector as long as it has electrical conductivity but does not cause a chemical change in a corresponding battery. Non-limiting examples of the negative current collector may include copper, stainless steel, aluminum, nickel, titanium, heat treated carbon, and/or copper or stainless steel that is surface treated with carbon, nickel, titanium, silver, and/or an aluminum-cadmium alloy. In some embodiments, the negative current collector may have a fine uneven structure (e.g., microstructure) at its surface to increase a binding force between the current collector and the negative active material. The negative current collector may have any suitable shape or form (such as a film, sheet, foil, net, porous, foam, or non-woven shape).

A separator may be between the positive electrode and the negative electrode, each electrode being manufactured as described above.

The separator may have a pore diameter of about 0.01 μm to about 10 μm and a thickness of about 5 μm to about 300 μm. Non-limiting examples of materials for forming the separator include an olefin-based polymer (such as polypropylene or polyethylene) and glass fiber. In some embodiments, the separator may have a sheet or non-fabric (e.g., non-woven) form. When a solid electrolyte, such as a polymer, is used as the electrolyte, the solid electrolyte may also act as a separator.

The non-aqueous electrolyte containing a lithium salt may include a non-aqueous solvent. Non-limiting examples of the non-aqueous electrolyte may include an organic solid electrolyte and an inorganic solid electrolyte.

Non-limiting examples of the non-aqueous solvent may include an aprotic organic solvent (such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, formamide, N,N-dimethylformamide, acetonitrile, nitromethane, methyl formate, methyl acetate, triester phosphate, trimethoxy methane, sulfolane, methyl sulfolane, 1,3-dimethyl-2-imidazolidinone, a tetrahydrofuran derivative, ether, methyl propionate, and/or ethyl propionate).

Non-limiting examples of the organic solid electrolyte may include a polyethylene derivative, a polyethylene oxide derivative, a polypropylene oxide derivative, a phosphate ester polymer, polyvinyl alcohol, and polyvinylidene fluoride.

Non-limiting examples of the inorganic solid electrolyte may include $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any suitable material that is easily dissolved in the non-aqueous solvent. Non-limiting examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylate lithium, and tetrakisphenyl lithium borate.

Figure 2:
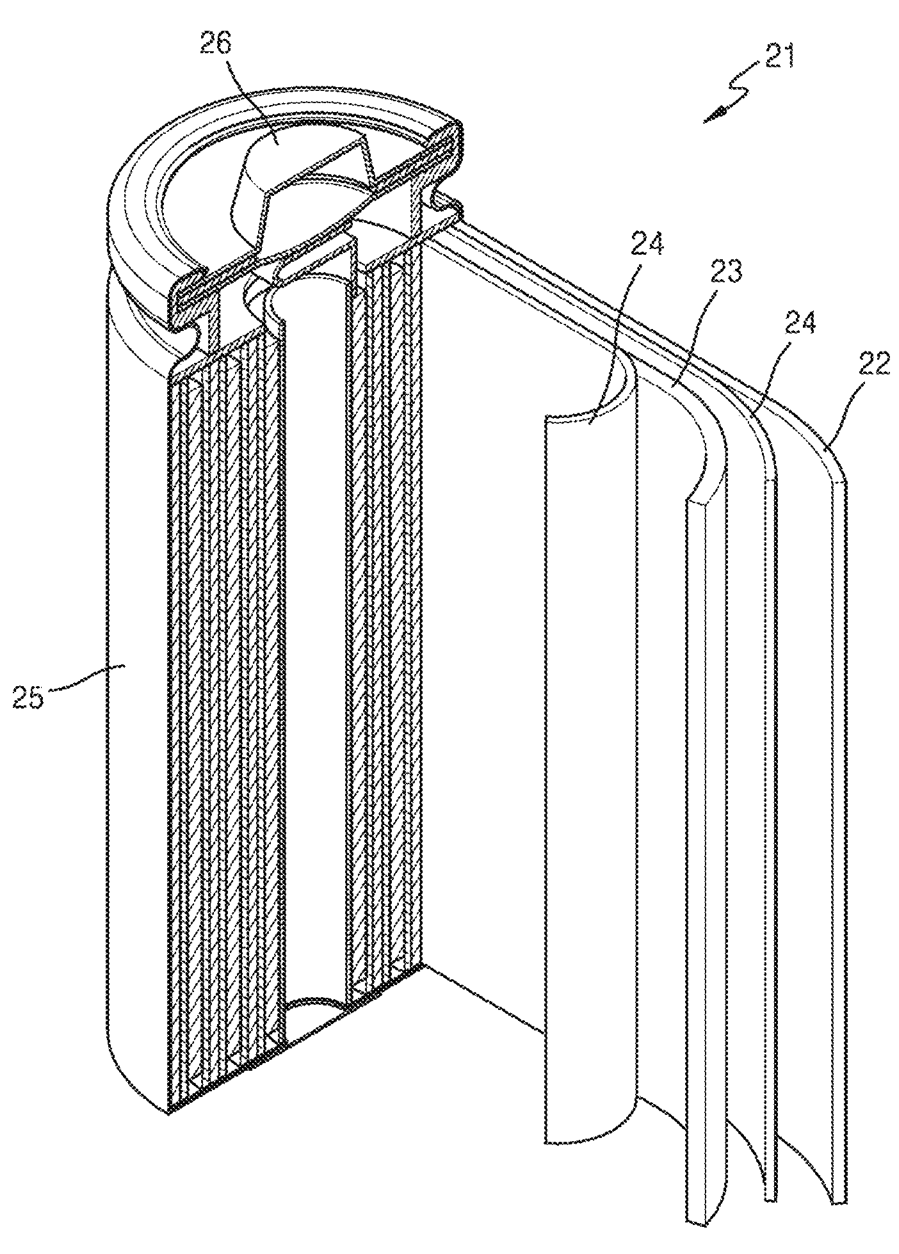
FIG. 2 is a schematic view of a lithium secondary battery including a positive electrode including a nickel-based active material according to an embodiment of the present disclosure.

FIG. 2 is a schematic view of a structure of a lithium secondary battery according to an embodiment of the present disclosure.

Referring to FIG. 2, the lithium secondary battery 21 includes a positive electrode 23, a negative electrode 22, and a separator 24. The positive electrode 23, the negative electrode 22, and the separator 24 may be wound or folded, and then sealed in a battery case 25. Then, the battery case 25 may be filled with an organic electrolyte and sealed with a cap assembly 26, thereby completing the manufacture of the lithium secondary battery 21. The battery case 25 may be a cylindrical type (format), a rectangular type (format), or a thin-film type (format). For example, the lithium secondary battery 21 may be a thin-film type (format) battery. For example, the lithium secondary battery 21 may be a lithium ion battery. The separator 24 may be between the positive electrode 23 and the negative electrode 22 to form a battery assembly. The battery assembly may be stacked in a bi-cell structure and impregnated with the organic electrolyte. The resultant assembly may be put into a pouch and hermetically sealed, thereby completing the manufacture of a lithium ion polymer battery. In some embodiments, a plurality of battery assemblies may be stacked to form a battery pack, which may be used in any device that requires high capacity and high output, for example, in a laptop computer, a smart phone, or an electric vehicle.

The lithium secondary battery may have excellent storage stability at a high temperature, improved lifetime characteristics, and high rate characteristics, and thus may be used in an electric vehicle (EV), for example, in a hybrid electric vehicle such as a plug-in hybrid electric vehicle (PHEV).

The following Examples and Comparative Examples are provided in order to further describe the present disclosure, but it will be understood that the Examples and Comparative Examples are not to be construed as limiting the scope of the embodiments, nor are the Comparative Examples to be construed as being outside the scope of the embodiments.

Preparation Example 1: Preparation of Composite Metal Hydroxide ($Ni_{0.6}Co_{0.2}Mn_{0.2}(OH)_2$)

A composite metal hydroxide powder ($Ni_{0.6}Co_{0.2}Mn_{0.2}(OH)_2$), which was radial, porous, and including plate particles, was obtained according to the co-precipitation method described below.

Ammonia water was added to a reactor, and raw materials for a nickel-based active material were mixed together to prepare a mixture of the raw materials of the nickel-based active material. The amount of the raw materials are controlled or selected so as to obtain a stoichiometric composition of a desired final product. The pH of the mixture was adjusted using a suitable amount of sodium hydroxide. Next, continuous stirring of the mixture within the reactor was carried out until a desired size of final product (i.e., composite metal hydroxide) was reached, at which point addition of the mixture of the raw materials to the reactor was stopped. The resulting product was subjected to a drying process, thereby yielding a composite metal hydroxide. This process of preparing the composite metal hydroxide will be described in more detail as follows.

The raw materials for the nickel-based active material (nickel sulfate ($NiSO_4 \cdot 6H_2O$), cobalt sulfate ($CoSO_4 \cdot 7H_2O$), and manganese sulfate ($MnSO_4 \cdot H_2O$)) were dissolved in distilled water as a solvent at a molar ratio of 6:2:2 to prepare a mixed solution of the raw materials of a nickel-based active material. In consideration of formation of a composite compound, diluted ammonia water ($NH_4OH$) and sodium hydroxide (NaOH), were prepared for use as a precipitator.

Then, to a batch-type reactor containing diluted ammonia water, a mixed solution of raw materials, ammonia water, and sodium hydroxide was continuously added from the top of the reactor. To maintain the pH inside the reactor, sodium hydroxide was added by a pH controller. The reaction was carried out with continuous stirring for about 20 hours, after which the introduction of the mixed solution of the raw materials was stopped.

The resulting slurry solution in the reactor was filtered and washed with high-purity distilled water, and then dried in a hot air oven for 24 hours, thereby yielding the composite metal hydroxide ($Ni_{0.6}Co_{0.2}Mn_{0.2}(OH)_2$).

Preparation Example 2: Preparation of Composite Metal Hydroxide ($Ni_{0.5}Co_{0.2}Mn_{0.3}(OH)_2$)

Composite metal hydroxide ($Ni_{0.5}Co_{0.2}Mn_{0.3}(OH)_2$) was obtained in the same manner as in Preparation Example 1, except that the amounts of nickel sulfate, cobalt sulfate, and manganese sulfate were changed to a molar ratio of 5:2:3 so as to yield the desired final product composition, and the reaction was carried out for 25 hours.

Preparation Example 3: Preparation of Composite Metal Hydroxide ($Ni_{0.8}Co_{0.1}Mn_{0.1}(OH)_2$)

Porous composite metal hydroxide ($Ni_{0.5}Co_{0.1}Mn_{0.1}(OH)_2$) was obtained in the same manner as in Preparation Example 1, except that the amounts of nickel sulfate, cobalt sulfate, and manganese sulfate were changed to a molar ratio of 8:1:1 so as to yield the desired final product composition, and the reaction was carried out for 25 hours.

Preparation Example 4: Preparation of Composite Metal Hydroxide ($Ni_{0.85}Co_{0.1}Al_{0.05}(OH)_2$)

Radial and porous composite metal hydroxide ($Ni_{0.85}Co_{0.1}Al_{0.05}(OH)_2$) was obtained in the same manner as in Preparation Example 1, except that a mixture of nickel sulfate ($NiSO_4 \cdot 6H_2O$), cobalt sulfate ($CoSO_4 \cdot 7H_2O$), and aluminum nitrate ($Al(NO_3)_3 \cdot 9H_2O$) were used as raw materials of nickel-based active material and mixed at a molar ratio of a 85:10:5, and the reaction was carried out for 18 hours.

Preparation Example 5: Preparation of Composite Metal Hydroxide ($Ni_{1/3}Co_{1/3}Mn_{1/3}(OH)_2$)

Composite metal hydroxide ($Ni_{1/3}Co_{1/3}Mn_{1/3}(OH)_2$) was obtained in the same manner as in Preparation Example 1, except that the amounts of nickel sulfate, cobalt sulfate, and manganese sulfate were changed to a molar ratio of 1:1:1, and the reaction was carried out for 28 hours.

Example 1: Preparation of Secondary Particles of Nickel-Based Active Material ($LiNi_{0.6}Co_{0.2}Mn_{0.2}O_2$)

The composite metal hydroxide powder of Preparation Example 1 ($Ni_{0.6}Co_{0.2}Mn_{0.2}(OH)_2$) and lithium hydroxide ($LiOH·H_2O$) having an average diameter of about 10 μm were dry mixed at a molar ratio of 1:1 using a high-speed mixer at a rate of 2,000 rpm. The exhaust port of a calcining furnace was opened, and a first heat treatment was performed on the mixture at a temperature of about 800° C. for about 6 hours in air, thereby yielding a secondary particle A of a nickel-based active material ($LiNi_{0.6}Co_{0.2}Mn_{0.2}O_2$).

The exhaust port of the calcining furnace was closed, and a second heat treatment was performed on the secondary particle A at a temperature of about 850° C. for about 6 hours in air, thereby yielding a secondary particle B of the nickel-based active material ($LiNi_{0.6}Co_{0.2}Mn_{0.2}O_2$).

Example 2: Preparation of Secondary Particles of Nickel-Based Active Material ($LiNi_{0.6}Co_{0.2}Mn_{0.2}O_2$)

Secondary particles of the nickel-based active material ($LiNi_{0.6}Co_{0.2}Mn_{0.2}O_2$) were obtained in the same manner as in Example 1, except that the temperature at which the second heat treatment was performed was changed to 870° C.

Example 3: Preparation of Coin Cell

The secondary particles of the nickel-based active material ($LiNi_{0.6}Co_{0.2}Mn_{0.2}O_2$) of Example 1 were used as the positive active material for a lithium secondary battery (also referred to as a coin cell) as follows.

96 g of the secondary particles of the nickel-based active material ($LiNi_{0.6}Co_{0.2}Mn_{0.2}O_2$) of Example 1, 2 g of polyvinylidene fluoride, 47 g of N-methylpyrrolidone (as a solvent), and 2 g of carbon black (conductive agent), were mixed. Bubbles were removed from the mixture using a mixer, thereby preparing a homogeneously dispersed slurry for forming a positive active material layer.

The slurry obtained therefrom was coated on an aluminum film current collector using a doctor blade to form a thin electrode plate. The thin electrode plate was then dried at a temperature of 135° C. for 3 hours or more, and then pressed and vacuum-dried to form a positive electrode.

A separator (thickness: about 16 μm) formed of a porous polyethylene (PE) film was positioned between the positive electrode and a lithium metal counter electrode. Then, an electrolyte was provided thereto, thereby completing manufacture of a CR2032-type coin cell.

A solution containing 1.1 M $LiPF_6$ dissolved in a mixed solvent of ethylene carbonate (EC) and ethylmethylcarbonate (EMC) at a volumetric ratio of 3:5 was used as the electrolyte.

Example 4: Preparation of Coin Cell

A coin cell was manufactured in the same manner as in Example 3, except that the secondary particles of the nickel-based active material of Example 2 ($LiNi_{0.6}Co_{0.2}Mn_{0.2}O_2$) were used instead of the secondary particles of the nickel-based active material of Example 1.

Example 5: Preparation of Secondary Particles of Nickel-Based Active Material ($LiNi_{0.5}Co_{0.2}Mn_{0.3}O_2$)

Secondary particles of the nickel-based active material ($LiNi_{0.5}Co_{0.2}Mn_{0.3}O_2$) were obtained in the same manner as in Example 1, except that the composite metal hydroxide ($Ni_{0.5}Co_{0.2}Mn_{0.3}(OH)_2$) of Preparation Example 2 was used instead of the composite metal hydroxide ($Ni_{0.6}Co_{0.2}Mn_{0.2}(OH)_2$) of Preparation Example 1, the temperature at which the first heat treatment was performed was changed to 800° C., and the temperature at which the second heat treatment was performed was changed to 890° C.

Example 6: Preparation of Secondary Particles of Nickel-Based Active Material ($LiNi_{0.8}Co_{0.1}Mn_{0.1}O_2$)

Secondary particles of the nickel-based active material ($LiNi_{0.5}Co_{0.1}Mn_{0.1}O_2$) were obtained in the same manner as in Example 1, except that the composite metal hydroxide ($LiNi_{0.8}Co_{0.1}Mn_{0.1}(OH)_2$) of Preparation Example 3 was used instead of the composite metal hydroxide ($Ni_{0.6}Co_{0.2}Mn_{0.2}(OH)_2$) of Preparation Example 1, the temperature at which the first heat treatment was performed was changed to 700° C., and the temperature at which the second heat treatment was performed was changed to 770° C.

Example 7: Preparation of Secondary Particles of Nickel-Based Active Material ($LiNi_{0.85}Co_{0.1}Al_{0.05}O_2$)

Secondary particles of the nickel-based active material ($LiNi_{0.85}Co_{0.1}Al_{0.05}O_2$) were obtained in the same manner as in Example 1, except that the radial and porous composite metal hydroxide ($Ni_{0.85}Co_{0.1}Al_{0.05}(OH)_2$) of Preparation Example 4 was used instead of the radial and porous composite metal hydroxide ($Ni_{0.6}Co_{0.2}Mn_{0.2}(OH)_2$) of Preparation Example 1, the temperature at which the first heat treatment was performed was changed to 650° C., and the temperature at which the second heat treatment was performed was changed to 720° C.

Example 8: Preparation of Secondary Particles of Nickel-Based Active Material ($LiNi_{1/3}Co_{1/3}Mn_{1/3}O_2$)

Secondary particles of the nickel-based active material ($LiNi_{1/3}Co_{1/3}Mn_{1/3}O_2$) were obtained in the same manner as in Example 1, except that the composite metal hydroxide ($Ni_{1/3}Co_{1/3}Mn_{1/3}(OH)_2$) of Preparation Example 5 was used instead of the composite metal hydroxide ($Ni_{0.6}Co_{0.2}Mn_{0.2}(OH)_2$) of Preparation Example 1, the temperature at which the first heat treatment was performed was changed to 800° C., and the temperature at which the second heat treatment was performed was changed to 900° C.

Example 9: Preparation of Secondary Particles of Nickel-Based Active Material ($LiNi_{1/3}Co_{1/3}Mn_{1/3}O_2$)

Secondary particles of a nickel-based active material were obtained in the same manner as in Example 1, except that the temperature at which the first heat treatment was performed was changed to 600° C.

Example 10: Preparation of Secondary Particles of Nickel-Based Active Material ($LiNi_{1/3}Co_{1/3}Mn_{1/3}O_2$)

Secondary particles of a nickel-based active material were obtained in the same manner as in Example 1, except that the temperature at which the second heat treatment was performed was changed to 900° C.

Comparative Preparation Example 1: Preparation of Composite Metal Hydroxide ($Ni_{0.6}Co_{0.2}Mn_{0.2}(OH)_2$)

Composite metal hydroxide ($Ni_{0.6}Co_{0.2}Mn_{0.2}(OH)_2$) having no pores and being without the radial arrangement of primary particles was prepared in the same manner as in Preparation Example 1, except that a continuous-type reactor was used instead of the batch-type reactor, and stirring was slowly progressed at a slow particle growth rate for 80 hours until the resulting composite metal hydroxide seed particles had attained a desired size. Once the reaction was in a steady state (stabilization), the overflow products were collected and dried.

Comparative Example 1: Preparation of Secondary Particles of Nickel-Based Active Material ($LiNi_{0.6}Co_{0.2}Mn_{0.2}O_2$)

The composite metal hydroxide ($Ni_{0.6}Co_{0.2}Mn_{0.2}(OH)_2$) having no pores and being without the radial arrangement of primary particles of Comparative Preparation Example 1 and lithium hydroxide ($LiOH \cdot H_2O$) having an average diameter of about 10 μm were mixed at a molar ratio of 1:1 using dry milling at a rate of 2,000 rpm. The exhaust port of a calcining furnace was opened and a first heat treatment was performed on the mixture at a temperature of about 870° C. for 15 hours in air. After the exhaust port of the calcining furnace was closed, a second heat treatment was performed on the product of the first heat treatment at a temperature of about 500° C. for 6 hours in air, thereby yielding secondary particles of the nickel-based active material ($LiNi_{0.6}Co_{0.2}Mn_{0.2}O_2$).

Comparative Preparation Example 2: Preparation of Composite Metal Hydroxide ($Ni_{0.6}Co_{0.2}Mn_{0.2}(OH)_2$)

Composite metal hydroxide ($Ni_{0.6}Co_{0.2}Mn_{0.2}(OH)_2$) having pores and being without the radial arrangement of primary particles was obtained in the same manner as in Comparative Preparation Example 1, except that stirring was slowly progressed at a slow particle growth rate for 20 hours until the resulting composite metal hydroxide seed particles had attained a desired size.

Comparative Example 2: Preparation of Secondary Particles of Nickel-Based Active Material ($LiNi_{0.6}Co_{0.2}Mn_{0.2}O_2$)

The composite metal hydroxide ($Ni_{0.6}Co_{0.2}Mn_{0.2}(OH)_2$) of Comparative Preparation Example 2 and lithium hydroxide ($LiOH \cdot H_2O$) having an average diameter of about 10 μm were mixed at a molar ratio of 1:1 and dry milled at a rate of 2,000 rpm. The exhaust port of a calcining furnace was opened and heat treatment was performed on the mixture in air at a temperature of about 880° C. for 15 hours, thereby yielding secondary particles of the nickel-based active material ($LiNi_{0.6}Co_{0.2}Mn_{0.2}O_2$).

Comparative Example 3: Preparation of Coin Cell

A coin cell was manufactured in the same manner as in Example 3, except that secondary particles of Comparative Example 1 ($LiNi_{0.6}Co_{0.2}Mn_{0.2}O_2$) were used instead of the secondary particles of the nickel-based active material of Example 1.

Comparative Example 4: Preparation of Coin Cell

A coin cell was manufactured in the same manner as in Example 3, except that secondary particles of Comparative Example 2 ($LiNi_{0.6}Co_{0.2}Mn_{0.2}O_2$) were used instead of the secondary particles of the nickel-based active material of Example 1.

Comparative Example 5: Preparation of Secondary Particles of Nickel-Based Active Material ($LiNi_{0.6}Co_{0.2}Mn_{0.2}O_2$)

Secondary particles of a nickel-based active material were obtained in the same manner as in Example 1, except that heat treatment was performed on a mixture of the composite metal hydroxide ($Ni_{0.6}Co_{0.2}Mn_{0.2}(OH)_2$) of Comparative Preparation Example 1 and lithium hydroxide ($LiOH \cdot H_2O$) having an average diameter of about 10 μm at a temperature of about 500° C. for 6 hours in air after an exhaust port of the calcining furnace was opened.

Comparative Example 6: Preparation of Secondary Particles of Nickel-Based Active Material ($LiNi_{0.6}Co_{0.2}Mn_{0.2}O_2$)

Secondary particles of a nickel-based active material were obtained in the same manner as in Example 1, except that a first heat treatment was performed on a mixture of the composite metal hydroxide ($Ni_{0.6}Co_{0.2}Mn_{0.2}(OH)_2$) of Comparative Preparation Example 1 and lithium hydroxide ($LiOH \cdot H_2O$) having an average diameter of about 10 μm at a temperature of about 800° C. and a second heat treatment was performed thereon at a temperature of about 950° C. in air.

Evaluation Example 1: Analysis Using Scanning Electron Microscope

1) Example 1 and Comparative Example 1

The secondary particle A of the nickel-based active material of Example 1, the secondary particle B of the nickel-based active material of Example 1, and the secondary particle of the nickel-based active material of Comparative Example 1 were analyzed using a scanning electron microscope (SEM). The scanning electron microscope used herein was Magellan 400L (manufactured by FEI Company, Hillsboro, OR). A pretreatment was performed on a sample cross section by milling using an JEOL CP2 for 4 hours at a voltage of 6 kV and a current of 150 uA. Then, the electron scanning analysis was performed.

Figure 3A:
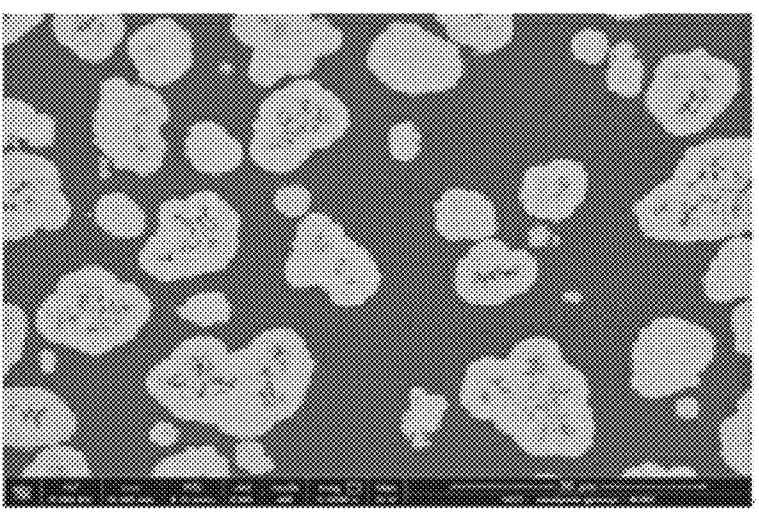
FIGS. 3A-3C are scanning electron microscope (SEM) images of cross-sections of secondary particles A of the nickel-based active material prepared according to Example 1.
Figure 3B:
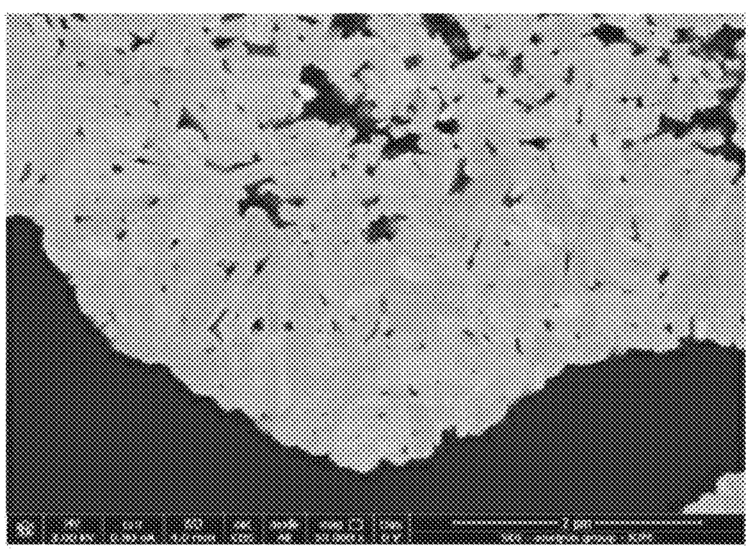
Figure 3C:
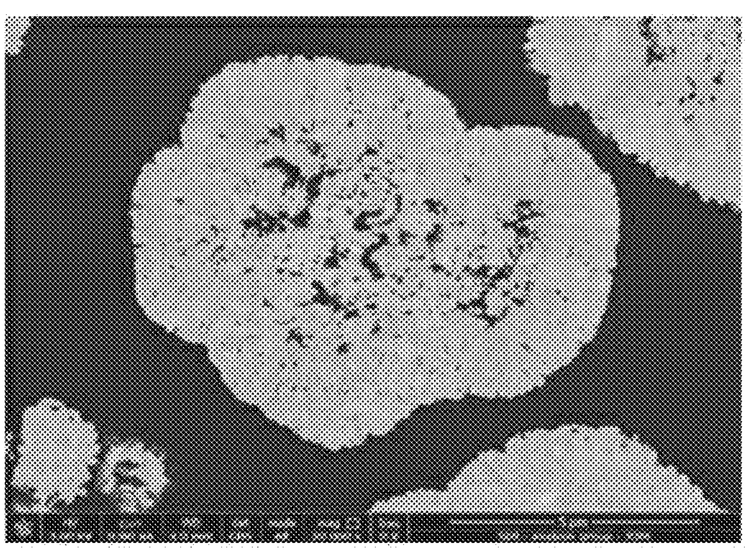

The results of the analysis are shown in FIGS. 3A-3H and 9A-9D. FIGS. 3A-3C are scanning electron microscope (SEM) images showing cross sections of various secondary particles A of the nickel-based active material of Example 1.

Figure 3D:
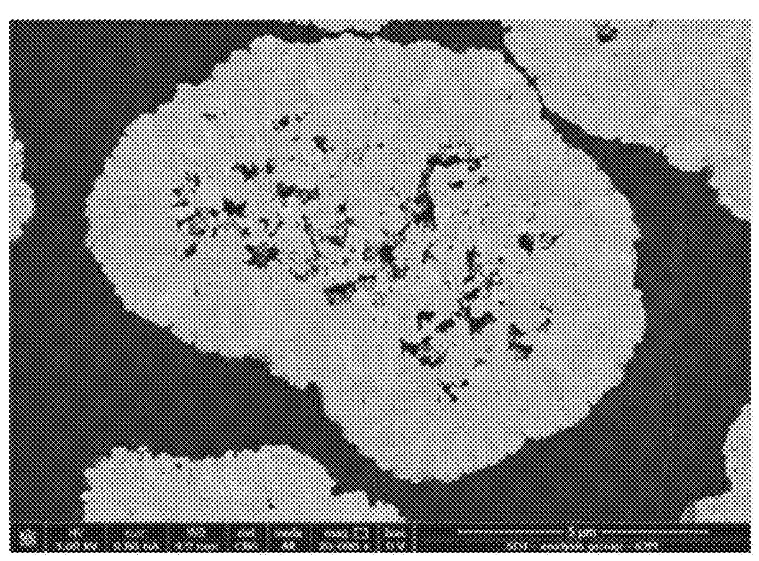
FIGS. 3D-3E are SEM images of cross-sections and the outer surface, respectively, of secondary particles B of the nickel-based active material prepared according to Example 1.
Figure 3E:
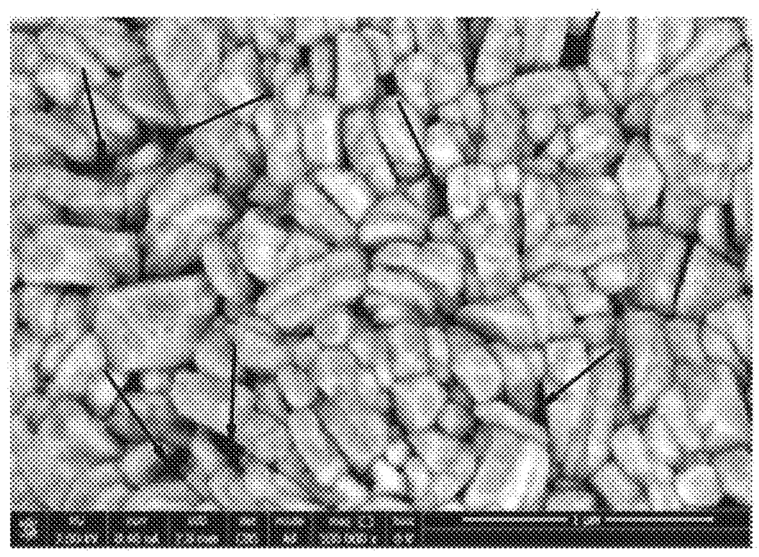
Figure 3F:
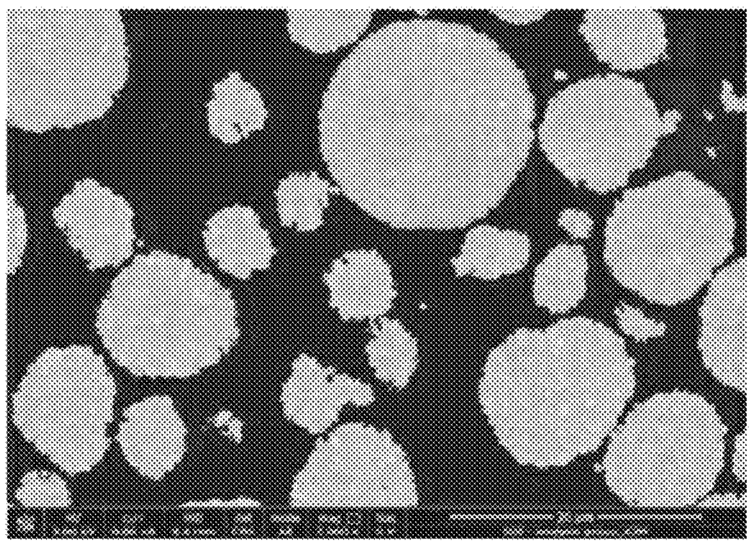
FIGS. 3F-3G and 3H are SEM images of cross-sections and an outer surface, respectively, of particles of the nickel-based active material prepared according to Comparative Example 1.
Figure 3G:
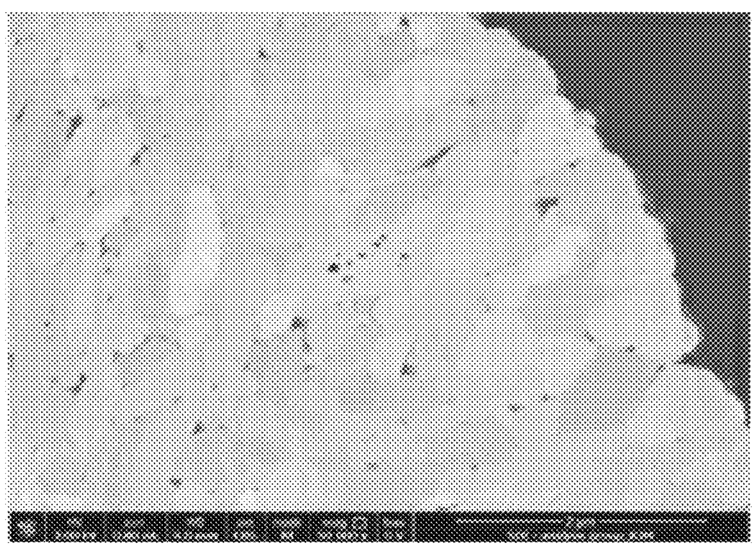
Figure 3H:
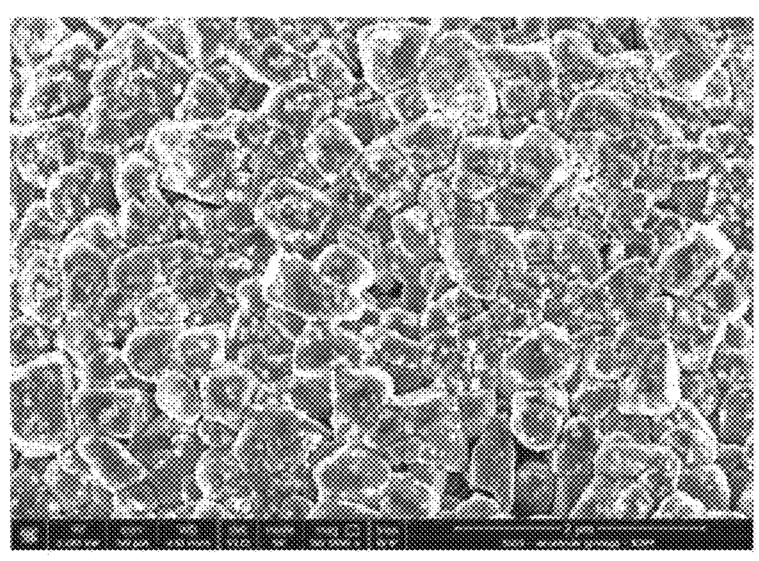
Figure 3I:
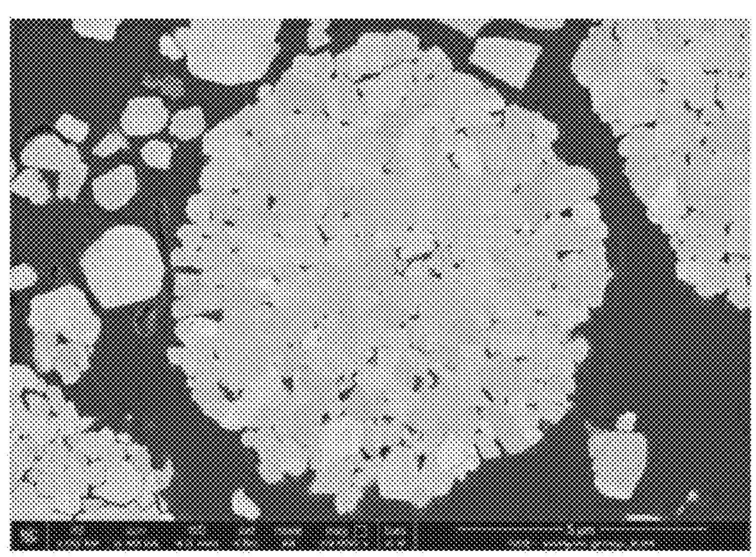
FIGS. 3I-3J are SEM images of nickel-based active materials prepared according to Comparative Example 2.

FIGS. 3D-3E are SEM images showing cross-sections and the outer surface, respectively, of various secondary particles B of the nickel-based active material of Example 1. FIGS. 3F-3G and 3H are SEM images showing cross sections and an outer surface, respectively, of secondary particles of the nickel-based active material of Comparative Example 1.

FIGS. 3A-3C indicate that the secondary particles A of the nickel-based active material (formed after the first heat treatment) were radial and the primary particles thereof were less densified (e.g., compared to the secondary particles B). FIGS. 3D-3E indicate that the secondary particles B of the nickel-based active material (formed after the second heat treatment on the secondary particle A of the nickel-based active material) had an irregular porous structure inside while maintaining a radial structure. The arrows in FIG. 3E indicate vertical channels between the primary particles, through which lithium ions may enter the particle.

As shown in FIG. 3E, open pores in a direction toward the inside having a size of about 10 nm to about 100 nm were present at the surface of the secondary particle of the nickel-based active material of Example 1, allowing access to the center of the particle. However, in contrast to Example 1, the secondary particles of the nickel-based active material of Comparative Example 1 were round and had almost or substantially no pores, as shown in FIGS. 3F-3H. The surface image of FIG. 3H shows that the primary particles were so densely arranged on the surface that almost no pores were present.

FIGS. 9A-9D are SEM images of secondary particles B of the nickel-based active material of Example 1.

Figure 9A:
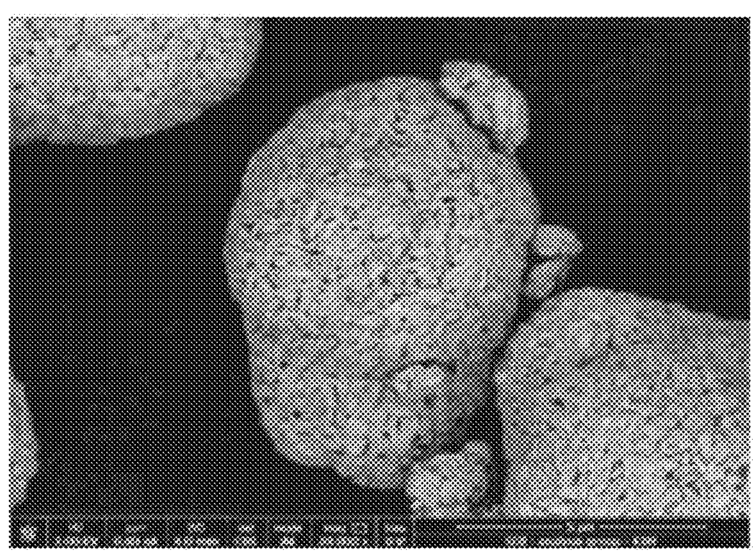
FIGS. 9A-9B are SEM images of secondary particles B of a nickel-based active material prepared according to Example 1.
Figure 9B:
Figure 9C:
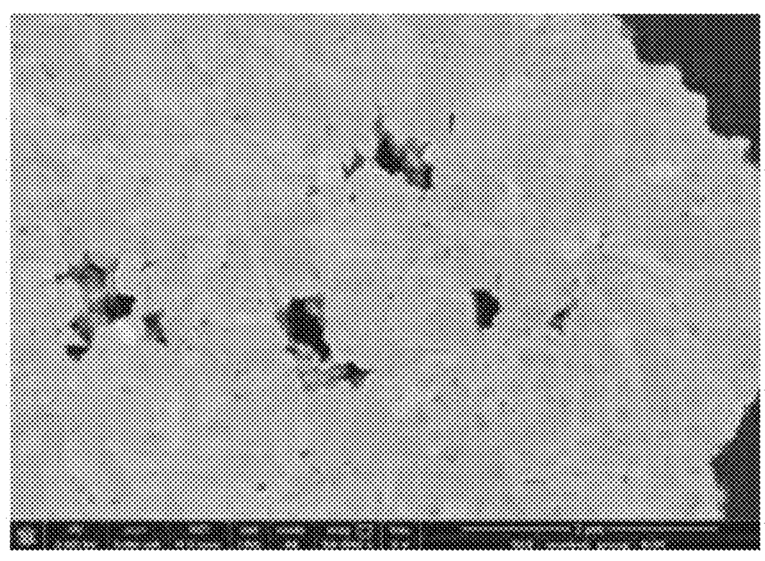
FIGS. 9C-9D are SEM images of cross-sections of secondary particles B of a nickel-based active material prepared according to Example 1.
Figure 9D:
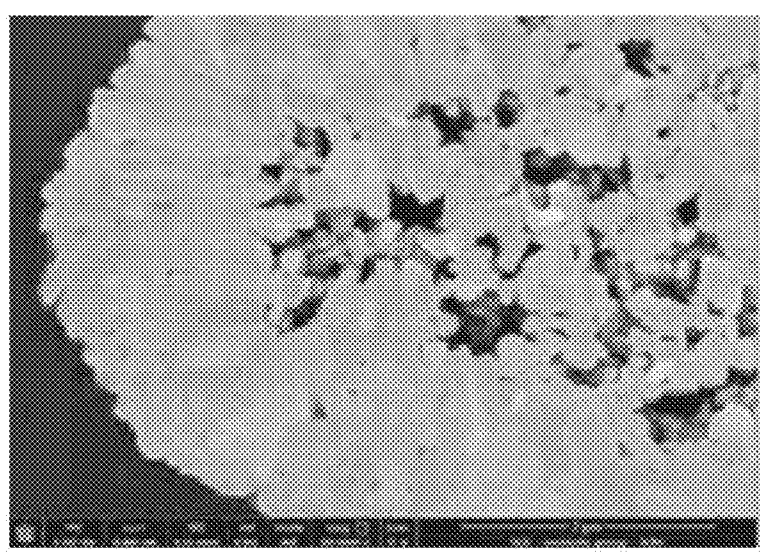

FIGS. 9A-9B indicate that the primary particles constituting the secondary particles of the nickel-based active material have a plate shape with a small thickness (see FIG. 9B). The cross sectional images of FIGS. 9C-9D indicate that the outer portion of the secondary particle of the nickel-based active material included radially arranged primary particles having a thin plate shape, and the inner portion of the secondary particles of the nickel-based active material had a porous structure with pores formed therein and a random arrangement of disc-shaped particles.

2) Comparative Examples 2, 5, and 6

Secondary particles of the nickel-based active material of Comparative Examples 2, 5, and 6 were analyzed using the above-described Magellan 400L scanning electron microscope. A pretreatment was performed on a sample cross section by milling using an JEOL CP2 for 4 hours at a voltage of 6 kV and a current of 150 uA. Then, the electron scanning analysis was performed.

Figure 3J:
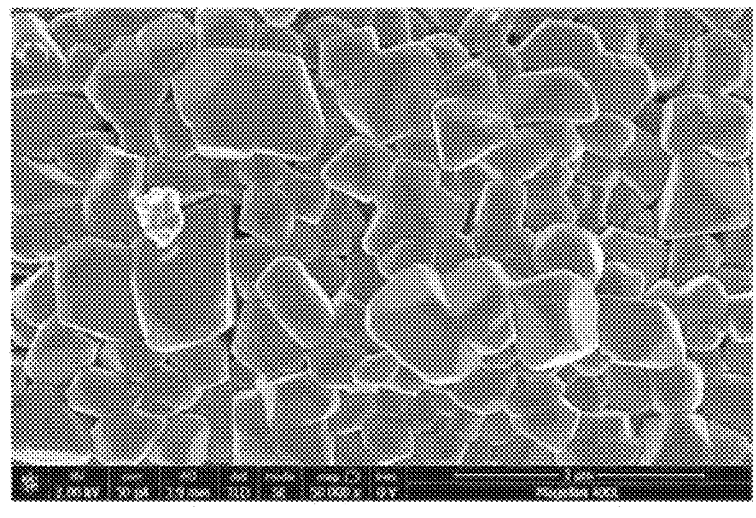

SEM images of a cross section and a surface of the secondary particle of the nickel-based active material of Comparative Examples 2 are shown in FIGS. 31 and 3J, respectively. FIGS. 31 and 3J indicate that the primary particles constituting the secondary particles of the nickel-based active material were round and randomly aligned, and pores were uniformly distributed within the inner and outer portions of the secondary particle of the nickel-based active material. Referring to FIG. 3J, it was confirmed that although the pores were partially present, the pores were entirely dispersed, and that the primary particle had a structure with no directionality.

Figure 3K:
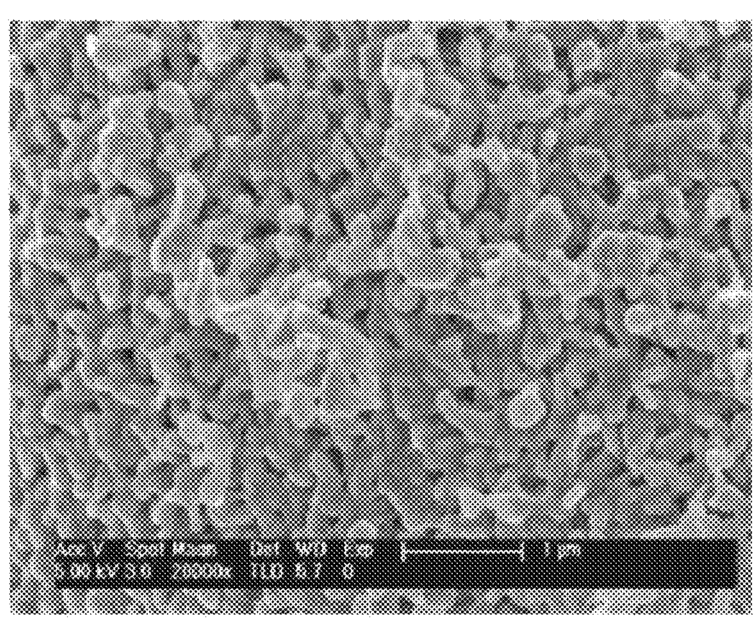
FIGS. 3K-3L are SEM images of nickel-based active materials prepared according to Comparative Examples 5 and 6, respectively.
Figure 3L:
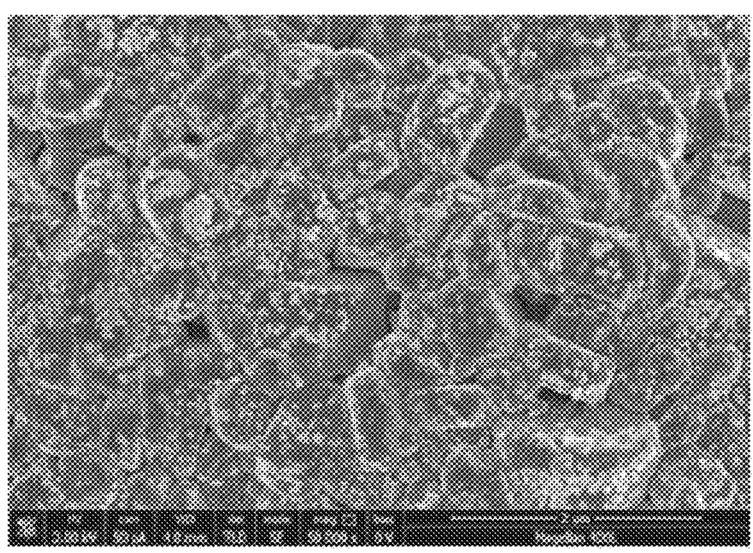
Figure 4A:
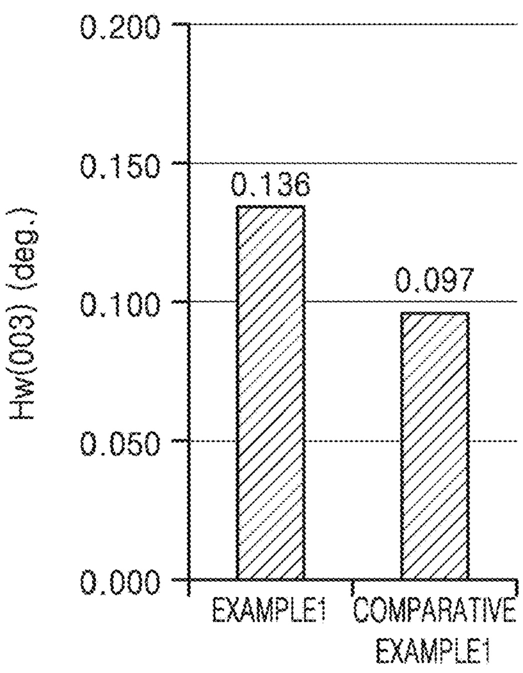
FIGS. 4A-4D are graphs comparing the full width at half maximum (FWHM) values (in degrees) of X-ray diffraction (XRD) peaks corresponding to reflections of the (003), (104), (018), and (110) planes, respectively, for nickel-based active materials prepared according to Example 1 and Comparative Example 1.
Figure 4B:
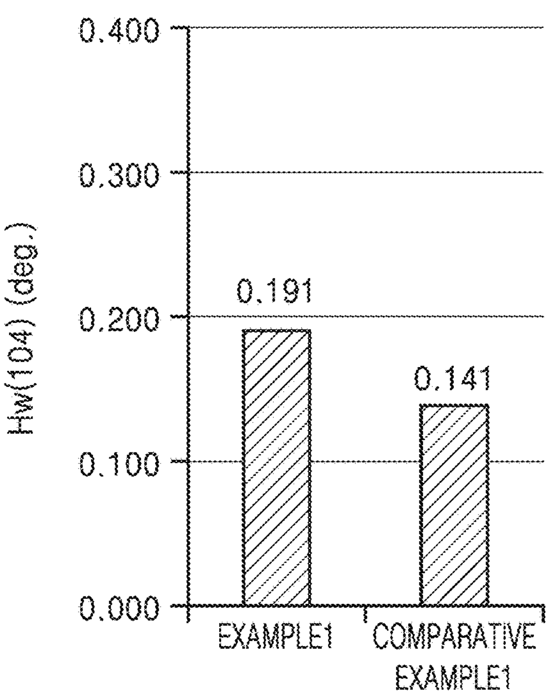
Figure 4C:
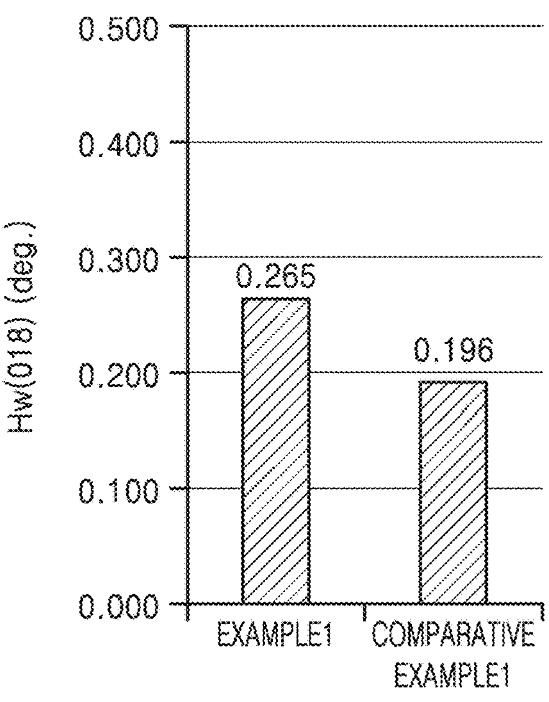
Figure 4D:
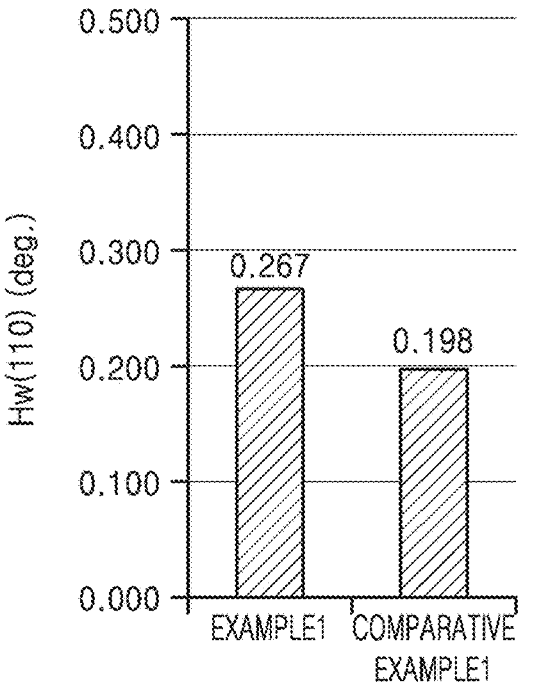

SEM images of surfaces of the secondary particles of the nickel-based active material of Comparative Examples 5 and 6 are shown in FIGS. 3K and 3L, respectively.

FIG. 3K appears to show that the secondary particles of the nickel-based active material of Comparative Example 5 was prepared using a first heat treatment temperature that was not high enough to manufacture a suitable particle structure, and the active material in the outer portion of the particle was not properly formed due to insufficient reaction of the composite metal hydroxide with lithium. FIG. 3L appears to show that in Comparative Example 6, the primary particles constituting the secondary particles of the nickel-based active material were overgrown (e.g., had an unsuitably large grain size) and had no pores, resulting in relatively low efficiency and low lifespan characteristics.

3) Example 1

Figure 12A:
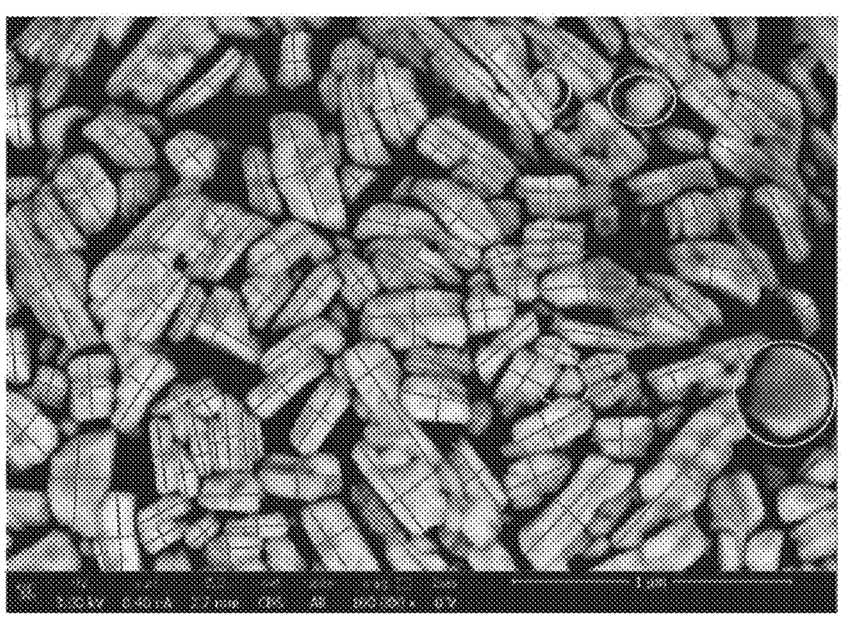
FIG. 12A is an SEM image of the surface of a secondary particle of a nickel-based active material prepared according to Example 1, in which the plate-shaped primary particles constituting the secondary particle are each analyzed with respect to their plane direction and thickness direction.

The secondary particle of the nickel-based active material of Example 1 was analyzed using the above-described Magellan 400L scanning electron microscope. A pretreatment was performed on a sample cross section by milling using an JEOL CP2 for 4 hours at a voltage of 6 kV and a current of 150 uA. Then, the electron scanning analysis was performed. FIG. 12A is an SEM image showing a surface of the secondary particle of the nickel-based active material of Example 1, and FIG. 12B is an SEM image showing a cross section of the secondary particle of the nickel-based active material.

Figure 12B:
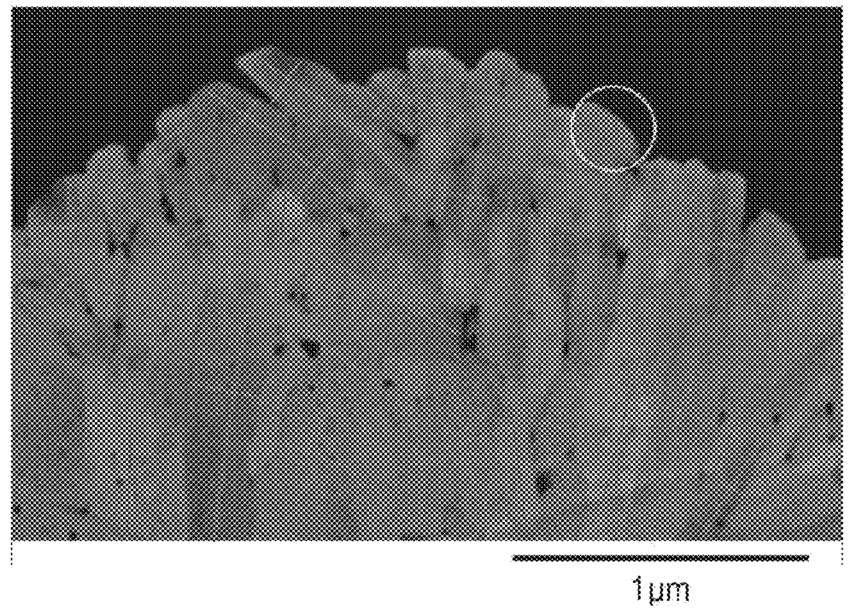
FIG. 12B is an SEM image of a cross-section of a secondary particle of a nickel-based active material prepared according to Example 1, in which the plate-shaped primary particles constituting the secondary particle are each analyzed with respect to their plane direction and thickness direction.

FIGS. 12A and 12B indicate that the primary particles constituting the secondary particles of the nickel-based active material mostly had plate shapes in a radial arrangement, while some of the primary particles were plate particles arranged in a non-radial direction, as highlighted by the circle in FIG. 12B. Here, the amount (e.g., proportion) of such non-radially arranged plate particles was about 3 parts by weight based on 100 parts by weight of the total weight of the radially arranged plate particles and the non-radially arranged plate particles.

Figure 13A:
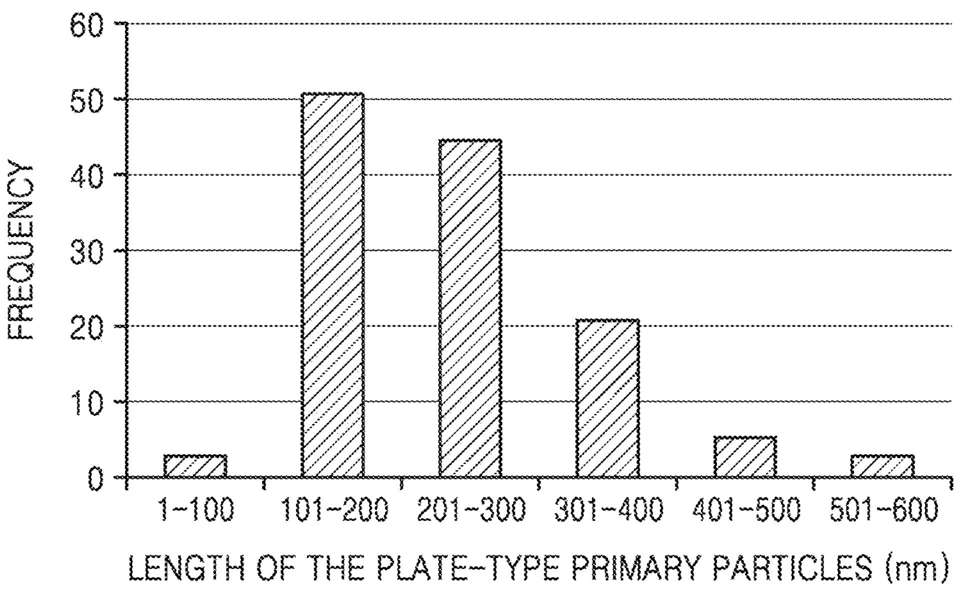
FIGS. 13A-13C are graphs showing the size distribution of the plate-type primary particles constituting the secondary particles of a nickel-based active material prepared according to Example 1 in terms of the length, thickness, and length-to-thickness ratio of the plate-type primary particles, respectively, at the surface of the secondary particles, as measured in FIG. 12A.
Figure 13B:
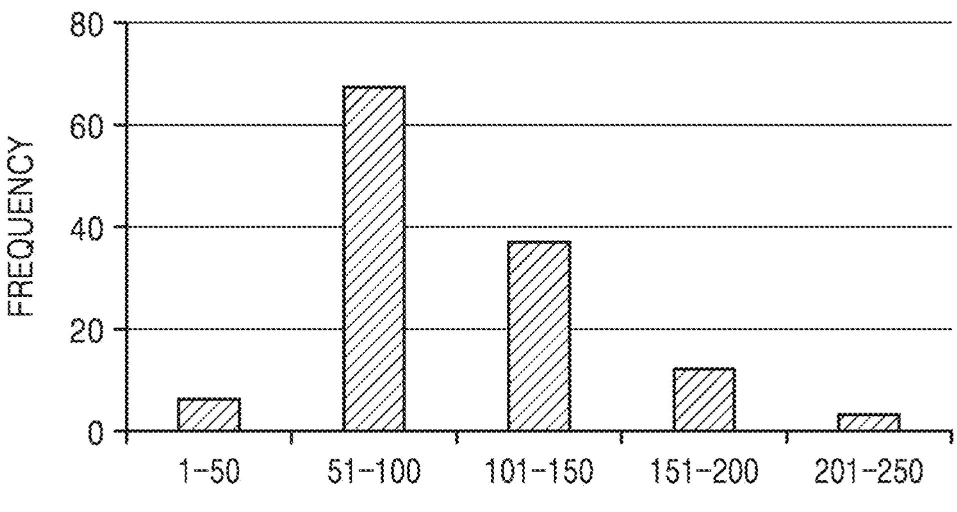
Figure 13C:
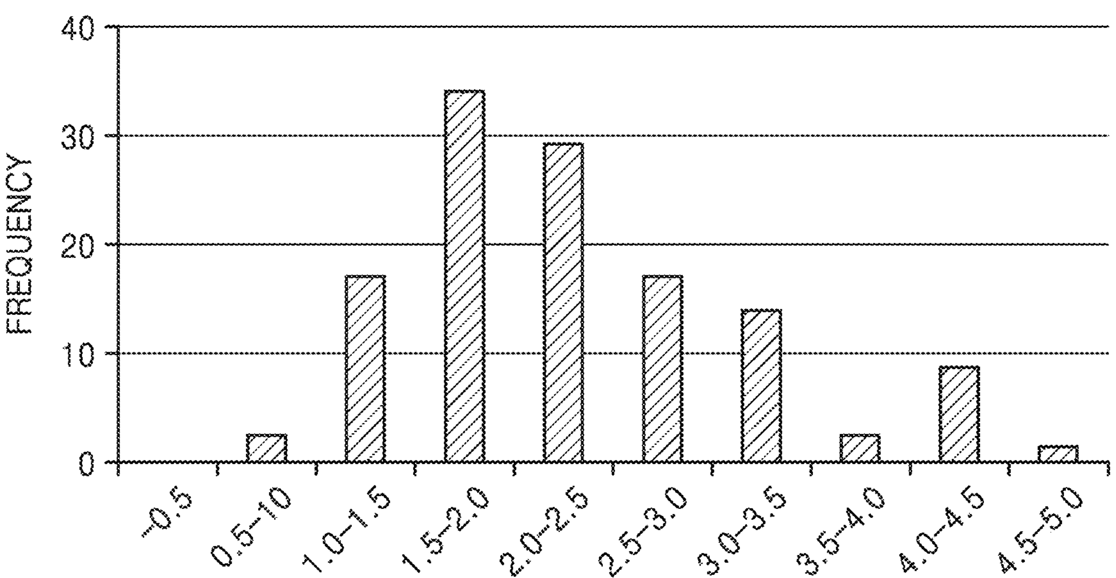
Figure 13D:
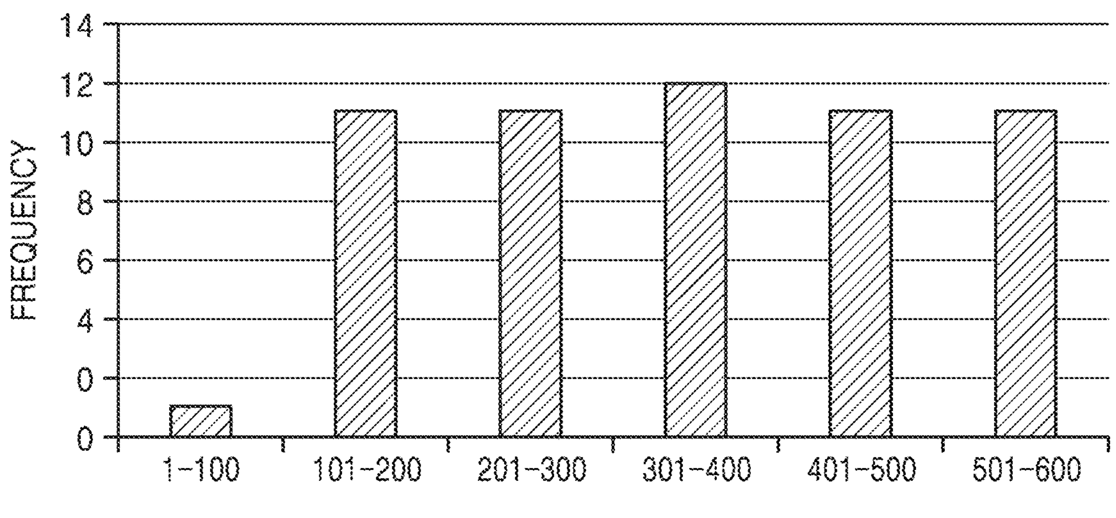
FIGS. 13D-13F are graphs showing the size distribution of the plate-type primary particles constituting the secondary particles of a nickel-based active material prepared according to Example 1 in terms of the length, thickness, and length-to-thickness ratio of the plate-type primary particles, respectively, at a cross section of the secondary particles of the nickel-based active material, as measured in FIG. 12B.
Figure 13E:
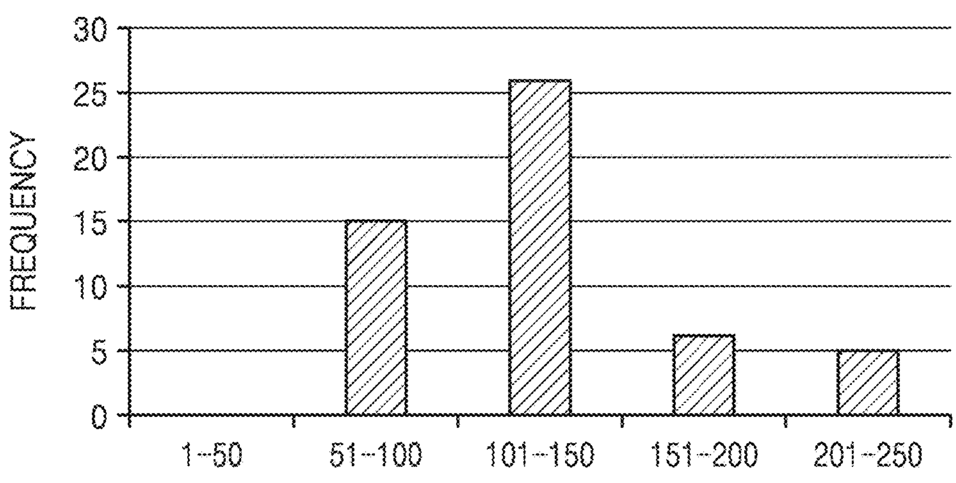
Figure 13F:
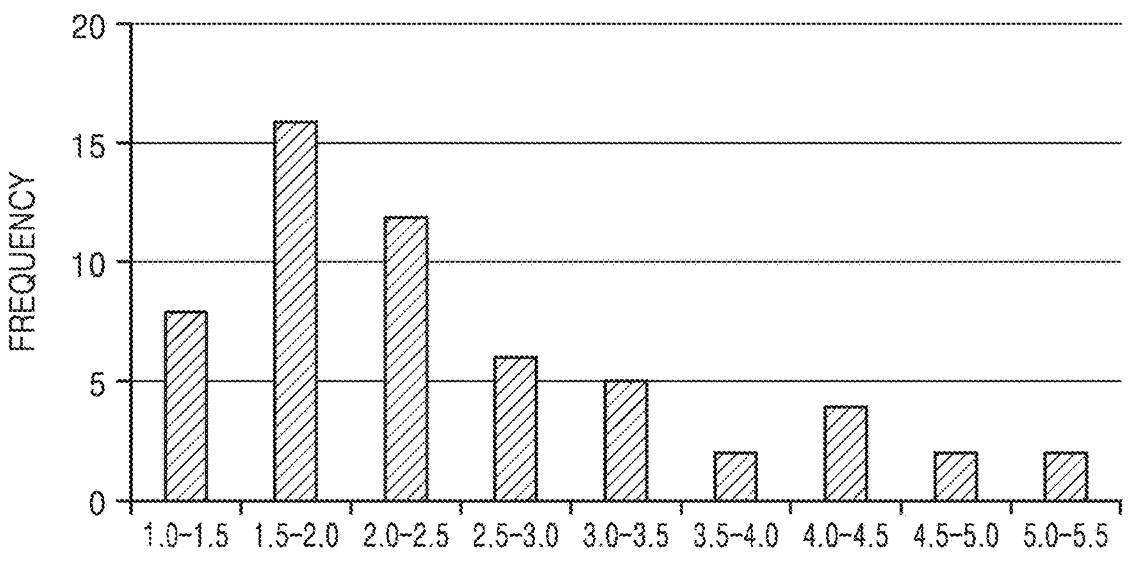

Referring to the orientations of the plate particles observed in the SEM images in FIGS. 12A and 12B, an average length, an average thickness, and an average ratio (average length/average thickness) of the plate particles were calculated. The calculation results are shown in Table 1 and FIGS. 13A-13F. FIGS. 13A-13C are graphs showing the size distribution with respect to the length and thickness of the plate-type primary particles at the surface of the secondary particle of the nickel-based active material, as shown in FIG. 12A. FIGS. 13D-13F are graphs showing the size distribution with respect to the length direction and thickness direction of the plate-type primary particles at the cross section of the secondary particle of the nickel-based active material shown in FIG. 12B. In the images, the short axis length line (superimposed on each primary particle) denotes the thickness direction of the plate-type primary particle, and the long axis length line (superimposed on each primary particle) denotes the length direction of the plate-type primary particle, wherein the short axis and the long axis each refer to a line with a relatively short axial line and a line with a relatively long axial line.

TABLE 1

| Surface | | Cross section | |
|---|---|---|---|
| Average length (nm) | 290 | Average length (nm) | 360 |
| Average thickness (nm) | 130 | Average thickness (nm) | 150 |
| Average ratio | 2.3 | Average ratio | 2.9 |

Evaluation Example 2: X-Ray Diffraction (XRD) Analysis

X-ray diffraction (XRD) analysis was performed on the secondary particles of the nickel-based active material of each of Examples 1 and Comparative Example 1, and the full width at half maximum (FWHM) values of peaks corresponding to the (003) planes (i.e., peaks at Bragg angle 2θ of about 18.6°), peaks corresponding to the (104) planes (i.e., peaks at Bragg angle 2θ of about 44.4°), peaks corresponding to the (018) plane (i.e., peaks at Bragg angle 2θ of about 64.4°), and peaks corresponding to the (110) plane (i.e., peaks at Bragg angle 2θ of about 65.0°) were examined.

The X-ray diffraction analysis was performed using an X'pert pro (manufactured by PANalytical, Almelo, Netherlands) utilizing Cu-Kα radiation (1.54056 Å).

The FWHM values of peaks corresponding to the (003) planes, the (104) planes, the (018) planes, and the (110) planes are compared in FIGS. 4A-4D, respectively.

In this regard, it was confirmed that the FWHM values of the peaks corresponding to the (003), (104), (018), and (110) planes were larger (wider) for the secondary particles of the nickel-based active material of Example 1 compared to the secondary particles of the nickel-based active material of Comparative Example 1. Accordingly, it was confirmed that the particle size of the secondary particles of the nickel-based active material of Example 1 was smaller than that of the secondary particle of the nickel-based active material of Comparative Example 1.

Evaluation Example 3: BET Surface Area

The surface areas of the secondary particle of the nickel-based active materials of Example 1 and Comparative Example 1 were measured using a BET method, and the results are shown in Table 2.

TABLE 2

| | Surface area of product of first heat treatment ($m^2/g$) | Surface area of product of second heat treatment |
|---|---|---|
| Example 1 | 0.38 | 0.36 |
| Comparative Example 1 | 0.30 | 0.41 |

Referring to Table 2, it was confirmed that the secondary particles of the nickel-based active material of Example 1 were densified upon the second heat treatment so that a surface area of the product of the second heat treatment was smaller than that of the product of the first heat treatment, whereas the secondary particles of the nickel-based active material of Comparative Example 1 were already densified by the time of the first heat treatment, so that a surface area of the product of the first heat treatment was relatively small (e.g., compared to Example 1). In addition, regarding the secondary particle of the nickel-based active material of Comparative Example 1, since a temperature at which the second heat treatment was performed was low and aluminum oxide particles remained on the surface of the secondary particle of the nickel-based active material of Comparative Example 1, the surface area of the secondary particle of the nickel-based active material of Comparative Example 1 was increased (see FIG. 3H).

Evaluation Example 4: Charging and Discharging Characteristics (Initial Efficiency)

Figure 5:
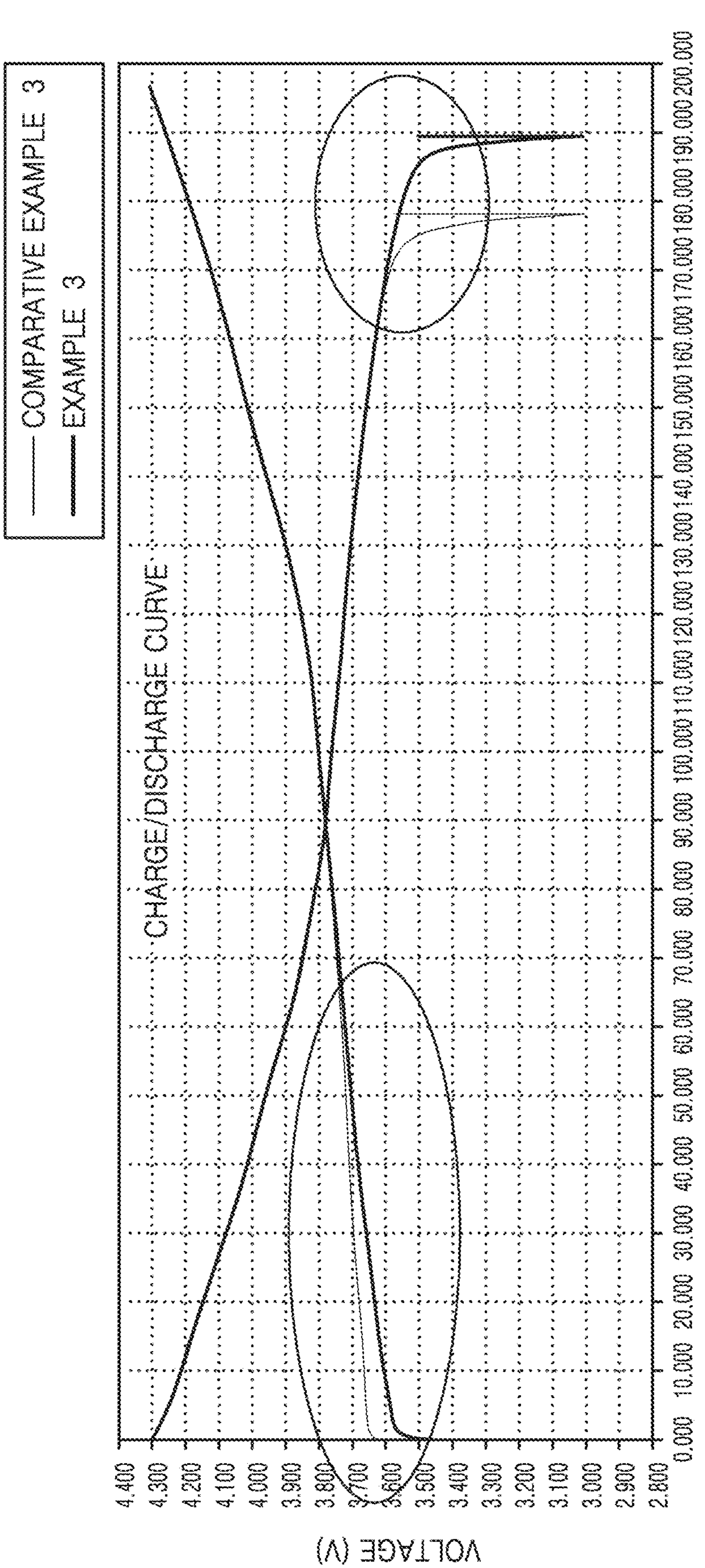
FIG. 5 is a graph showing voltage-capacity charge/discharge curves for coin cells prepared according to Example 3 and Comparative Example 3.

The coin cells of Example 3 and Comparative Example 3 were charged and discharged once at 0.1 C to perform a formation process. Then, the coin cells were charged and discharged once at 0.2 C to generate an initial charge/discharge cycling curve (shown in FIG. 5). As the coin cells were repeatedly charged and discharged at 1 C for 50 times, the charging and discharging characteristics were observed. Charging and discharging were carried out in constant current (CC) mode, up to a voltage of 4.3 V for charging and down to 3.0 V for discharging, then changed in constant voltage (CV) mode with a cut-off current of 0.05 C (e.g., CC-CV cycling).

(1) Initial Charging Efficiency (I.C.E.)

The initial charging and discharging efficiency was measured according to Equation 1:

$$\text{Initial charging and discharging efficiency [\%]} = [1^{st} \text{ cycle discharging capacity}/1^{st} \text{ cycle charging capacity}] \times 100 \quad \text{Equation 1}$$

The initial charging and discharging efficiencies of the coin cells of Example 3 and Comparative Example 3 were measured, and the results are shown in Table 3.

TABLE 3

| | Charging capacity (mAh/g) | Discharge capacity (mAh/g) | I.C.E. (%) |
|---|---|---|---|
| Example 3 | 197.8 | 190.0 | 96.0 |
| Comparative Example 3 | 197.4 | 179.3 | 90.8 |

Referring to Table 3, it was confirmed that the coin cell of Example 3 had improved initial charging and discharging efficiency compared to the coin cell of Comparative Example 3.

Evaluation Example 5: Charging and Discharging Characteristics (Rate Performance)

The coin cells of Example 3 and Comparative Example 3 were charged at a constant current (0.2 C) and a constant voltage (4.3 V, 0.05 C cut-off), rested for 10 minutes, and then discharged at a constant current (0.2 C, 0.33 C, 0.5 C, 1 C, 2 C, or 3 C) until the voltage reached 3.0 V. That is, as the number of charging and discharging cycle increased, the discharge rate was periodically changed to 0.2 C, 0.33 C, 0.5 C, 1 C, 2 C, or 3 C to evaluate the rate capability of each of the coin cells of Example 3 and Comparative Example 3. Here, during the $1^{st}$~$3^{rd}$ charging and discharging cycles, the coin cells were each discharged at a rate of 0.1 C. The rate capability (e.g., with respect to 0.1 C) was measured according to Equation 2:

$$\text{High-rate discharging capability (\%)} = (\text{discharging capacity when a cell is discharged at a specific constant current})/(\text{discharging capacity when a cell is discharged at a rate of 0.1 C}) \times 100 \quad \text{Equation 2}$$

Rate capability results are shown in Table 4.

TABLE 4

| | Rate-dependent capacity/capacity at 0.1 C (%) | | | | | |
|---|---|---|---|---|---|---|
| | 0.2 C | 0.33 C | 0.5 C | 1 C | 2 C | 3 C |
| Example 3 | 98.6 | 97.5 | 96.0 | 93.6 | 90.3 | 87.9 |
| Comparative Example 3 | 98.1 | 96.5 | 95.0 | 92.3 | 89.3 | 87.3 |

Referring to Table 4, it was confirmed that the coin cell of Example 3 had improved high-rate discharging capabilities, compared to the coin cell of Comparative Example 3.

In addition, referring to Table 4, it was confirmed that resistance to lithium diffusion was significantly reduced in a low voltage range of the coin cell of Example 3 (compared to the coin cell of Comparative Example 3) so that an actual discharging capacity of the coin cell of Example 3 was greatly improved with respect to the same charging capacity (with the same transition metal composition).

Evaluation Example 6: Lifespan Characteristics

1) Example 3 and Comparative Example 3

The coin cells of Example 3 and Comparative Example 3 were charged and discharged once at 0.1 C to perform a formation process. Then, the coin cells were charged and discharged once at 0.2 C to identify initial (baseline) charging and discharging characteristics. The coin cells were repeatedly charged and discharged at 1 C for 50 times, and the charging and discharging characteristics were observed. During charging, the charging begin in a CC mode, and then, the mode was changed into a CV mode which is set to cut off at 0.05 C and 4.3 V; and during discharging, the cut-off voltage was set at 3.0 V in a CC mode.

Figure 6:
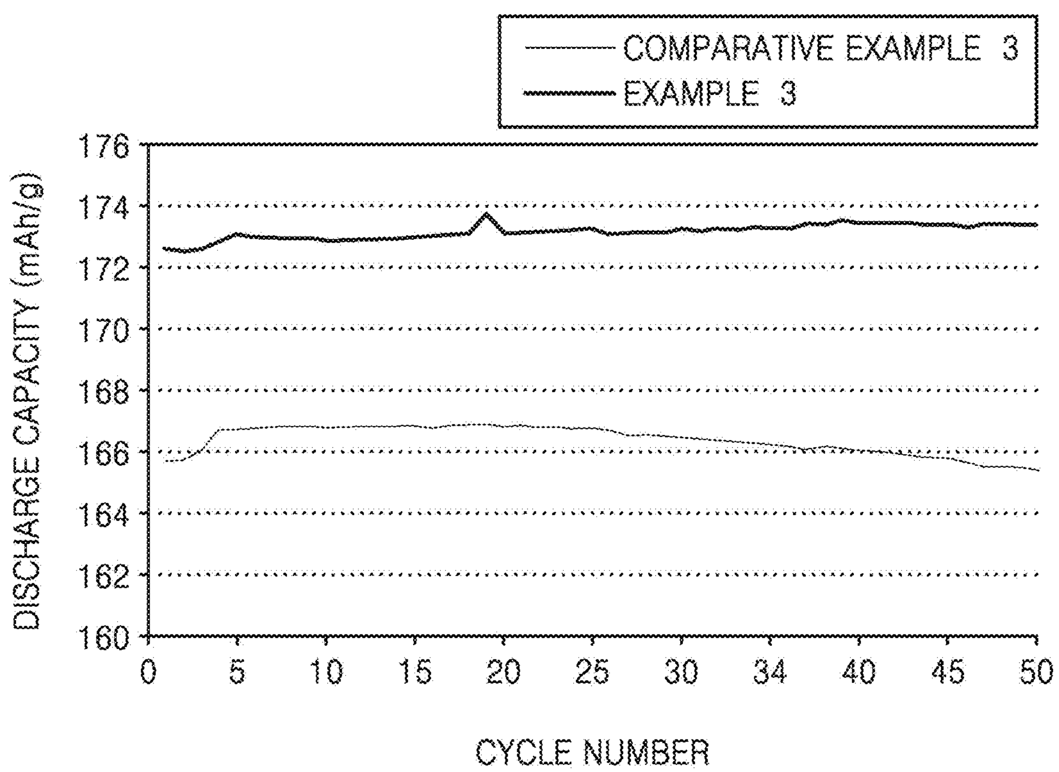
FIG. 6 is a graph showing changes in discharge capacity with respect to charge/discharge cycle number for coin cells prepared according to Example 3 and Comparative Example 3.

The changes in discharge capacity over repeated cycles are shown in FIG. 6.

Referring to FIG. 6, it was confirmed that resistance to lithium diffusion was significantly reduced in the coin cell of Example 3, compared to the coin cell of Comparative Example 3. Thus, an actual discharging capacity of the coin cell of Example 3 was greatly improved at the same charging capacity (with the same transition metal composition). In addition, it was confirmed that the coin cell of Example 3 had high-rate capability and improved lifespan characteristics, compared to the coin cell of Comparative Example 3.

Evaluation Example 7: Powder Conductivity

The powder conductivity of the secondary particles of the nickel-based active material of each of Example 1 and Comparative Example 1 was evaluated.

The powder conductivity was measured by pelletizing the powder under various pressures and measuring the surface resistance of the pellets. Here, the surface resistance was measured by using a LORESTA-GP (manufactured by MITSUBISHI, Tokyo, Japan), and the results are shown in FIG. 7.

Figure 7:
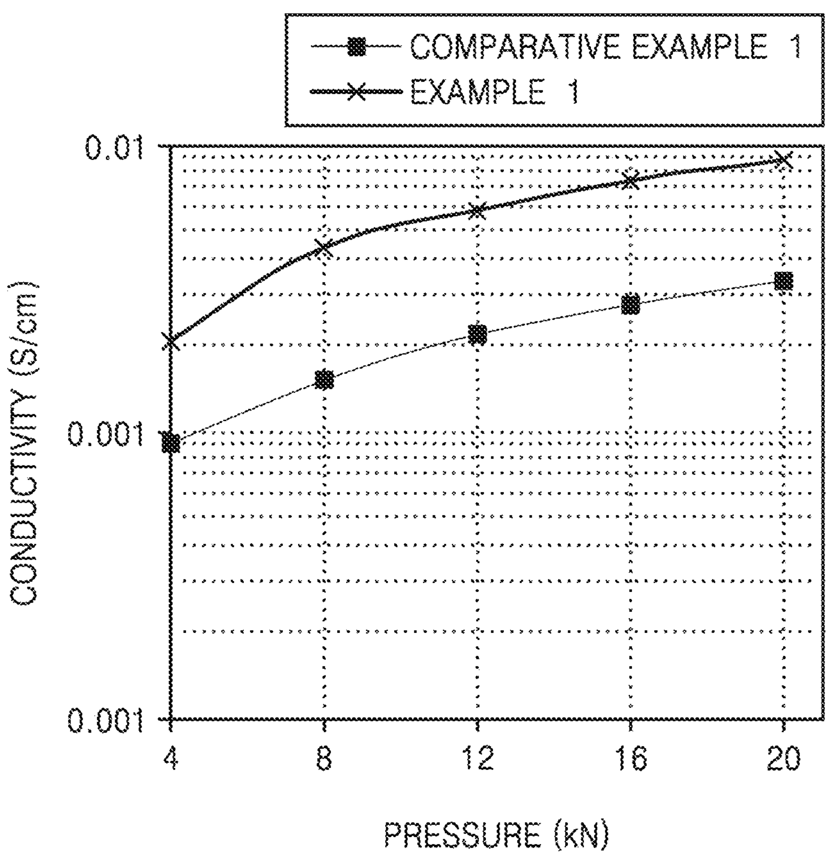
FIG. 7 is a graph showing the conductivity of powders of secondary particles of nickel-based positive active materials prepared according to Example 1 and Comparative Example 1 with respect to the pelletizing pressure.

Referring to FIG. 7, it was confirmed that the secondary particles of the nickel-based active material of Example 1 had a relatively higher powder conductivity than the secondary particles of the nickel-based active material of Comparative Example 1 at every pellet pressure.

Evaluation Example 8: Porosity Evaluation Using Scanning Electron Microscopy

The secondary particle of the nickel-based active material of Examples 1 and 2 were analyzed using the Magellan 400L SEM described above. A pretreatment was performed on a sample cross section by milling using an JEOL CP2 for 4 hours at a voltage of 6 kV and a current of 150 uA. Then, the electron scanning analysis was performed under the conditions of 3.1 pA SE.

Figure 14A:
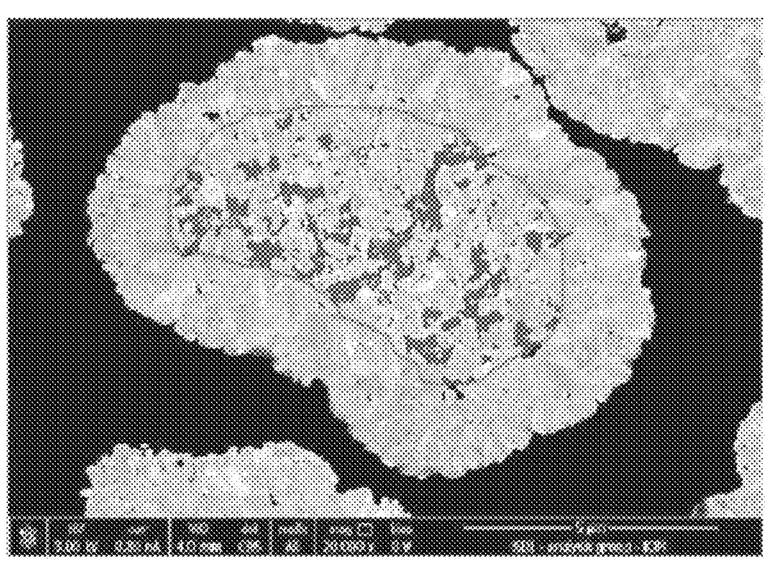
FIG. 14A is an SEM image of a cross section of a secondary particle B of a nickel-based active material ($LiNi_{0.6}Co_{0.2}Mn_{0.2}O_2$) prepared according to Example 1.
Figure 14B:
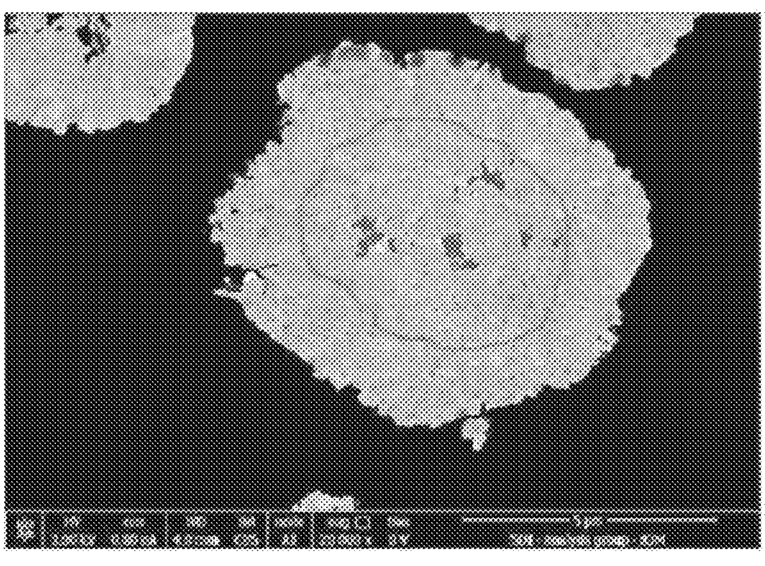
FIG. 14B is an SEM image of a cross section of a secondary particle B of a nickel-based active material ($LiNi_{0.6}Co_{0.2}Mn_{0.2}O_2$) prepared according to Example 2.

The results of the analysis are shown in Table 5 and FIGS. 14A and 14B.

FIG. 14A is an SEM image of a cross section of the secondary particle B of the nickel-based active material ($LiNi_{0.6}Co_{0.2}Mn_{0.2}O_2$) prepared according to Example 1.

FIG. 14B is an SEM image of a cross section of the secondary particle B of the nickel-based active material ($LiNi_{0.6}Co_{0.2}Mn_{0.2}O_2$) prepared according to Example 2. In FIGS. 14A and 14B, the area inside the outline is an inner portion while the area outside the outline is an outer portion.

TABLE 5

| | | Particle fraction (%) | Porosity fraction (%) |
|---|---|---|---|
| Example 1 | Overall | 92.7 | 7.3 |
| | Inner portion | 83.5 | 16.5 |
| | Outer portion | 99.3 | 0.7 |
| Example 2 | Overall | 98.5 | 1.5 |
| | Inner portion | 96.7 | 3.3 |
| | Outer portion | 99.7 | 0.3 |

The particle fraction refers to a ratio of an area occupied by particles to a total area, and the porosity fraction refers to a ratio (%) of an area occupied by pores to a total area of the particle cross-section.

Referring to Table 5, it was confirmed that the secondary particle of the nickel-based active material of each of Examples 1 and 2 showed higher porosity in the inner portion than that in the outer portion, and had a porous structure with developed pores.

Evaluation Example 9: Lithium Diffusion

The lithium diffusion was evaluated by determining the lithium diffusion constants for coin cells of Examples 3 and 4 and Comparative Examples 3 and 4 using an VMP3 battery cycler (manufactured by Bio-Logic, Seyssinet-Pariset, France). Lithium diffusion constants were determined by measuring the time-dependent voltage decay upon application of a current pulse according to Galvanostatic Intermittent Titration Technique (GITT).

Figure 8:
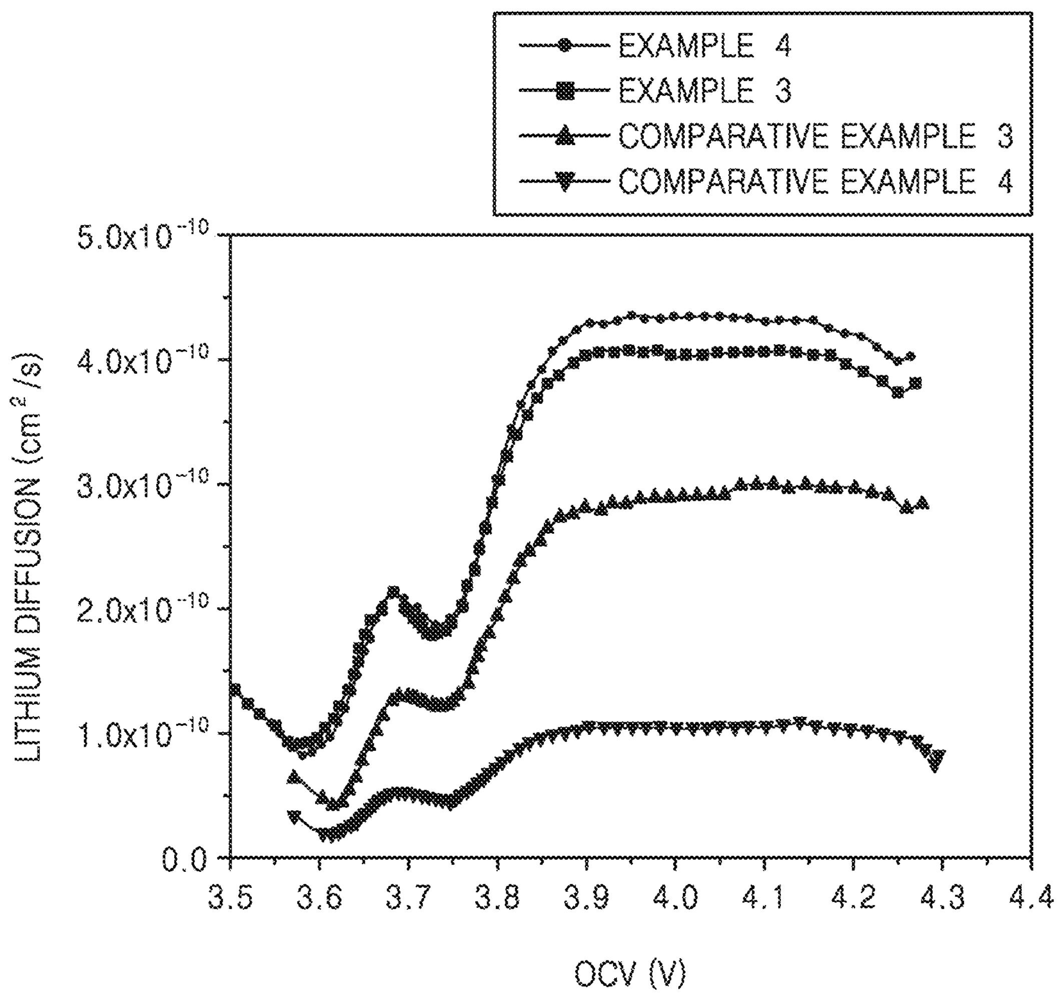
FIG. 8 is a graph showing variations in lithium diffusion constant with respect to open circuit voltage (e.g., as a stand-in for state of charge) for coin cells prepared according to Examples 3 and 4 and Comparative Examples 3 and 4.

The results of the lithium diffusion measurements are shown in FIG. 8. In FIG. 8, the expression "OCV" refers to the open circuit voltage (e.g., as a stand-in for state of charge) of the battery.

Referring to FIG. 8, it was confirmed that the coin cells of Examples 3 and 4 showed significantly higher lithium diffusion constants compared to the coin cells of Comparative Examples 3 and 4.

Evaluation Example 10: Analysis of Pore Size

The average size of the open pores in the secondary particles of the nickel-based active material of Example 1 was measured by a BET method.

The results of the analysis of the pore size are shown in Table 6.

TABLE 6

| | Average pore size (nm) |
|---|---|
| Example 1 | 20.862 |

Referring to Table 6, it was confirmed that secondary particles of the nickel-based active material of Example 1 had a porous structure with well-developed micropores.

Evaluation Example 11: High-Temperature Lifespan (45° C.)

The high-temperature lifespan of the coin cells of Example 3 and Comparative Examples 3 and 4 was evaluated as follows.

First, the coin cells of Example 3 and Comparative Examples 3 and 4 were charged and discharged once at 0.1 C to perform a formation process. Then, the coin cells were charged and discharged once at 0.2 C to identify initial (baseline) charging and discharging characteristics. The coin cells were repeatedly charged and discharged at 45° C. at a rate of 1 C for 50 times, during which the charging and discharging characteristics were observed. Charging and discharging were carried out in CC-CV mode with a charge cut off at 0.05 C and 4.3 V and a discharge cut off at 3.0 V.

Figure 10:
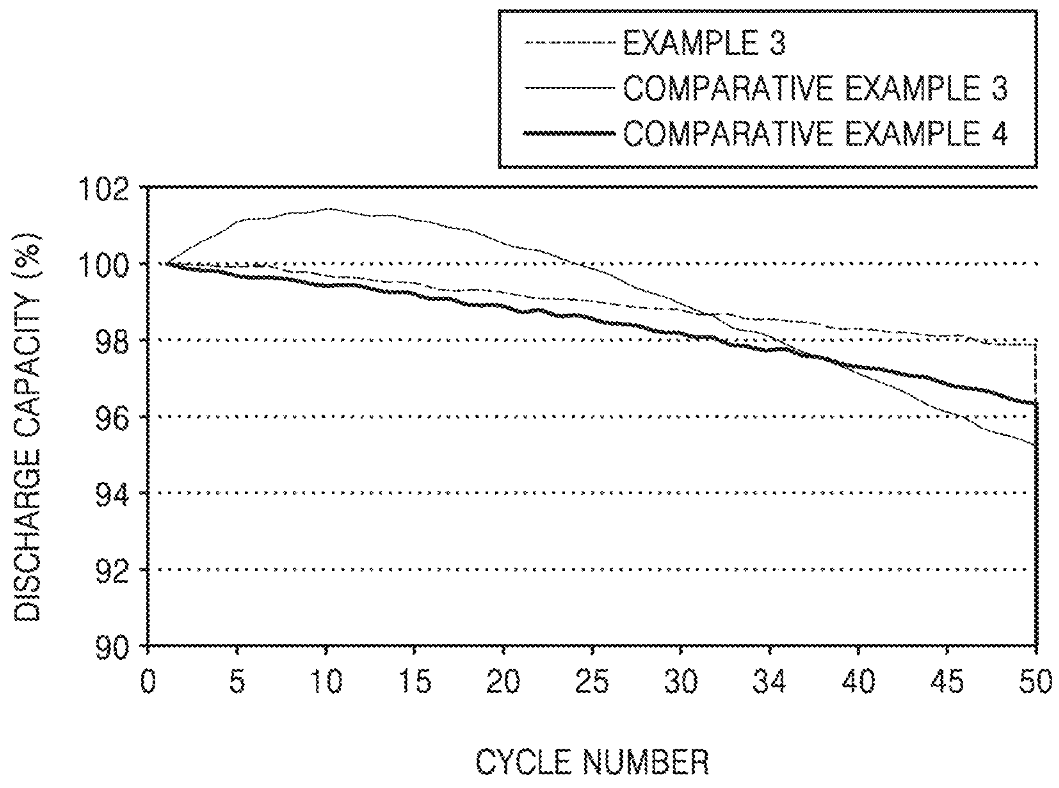
FIG. 10 is a graph showing variation of discharge capacity with respect to cycle number after cycling at high-temperature (45° C.) for coin cells prepared according to Example 3 and Comparative Examples 3 and 4.

The changes in discharge capacity with respect to cycle number are shown in FIG. 10.

Referring to FIG. 10, it was confirmed that the coin cell of Example 3 had improved high-temperature lifespan characteristics compared to the coin cells of Comparative Examples 3 and 4.

Evaluation Example 12: Impedance (Resistance) Analysis after High-Temperature Lifespan Test The coin cells of Example 3 and Comparative Examples 3 and 4 were evaluated by analyzing the cell impedance before and after performing the high-temperature lifespan test (Evaluation Example 11). The results of the impedance analysis (Nyquist plot) after performing the high-temperature lifespan test (Evaluation Example 11) are shown in FIG. 11.

Figure 11:
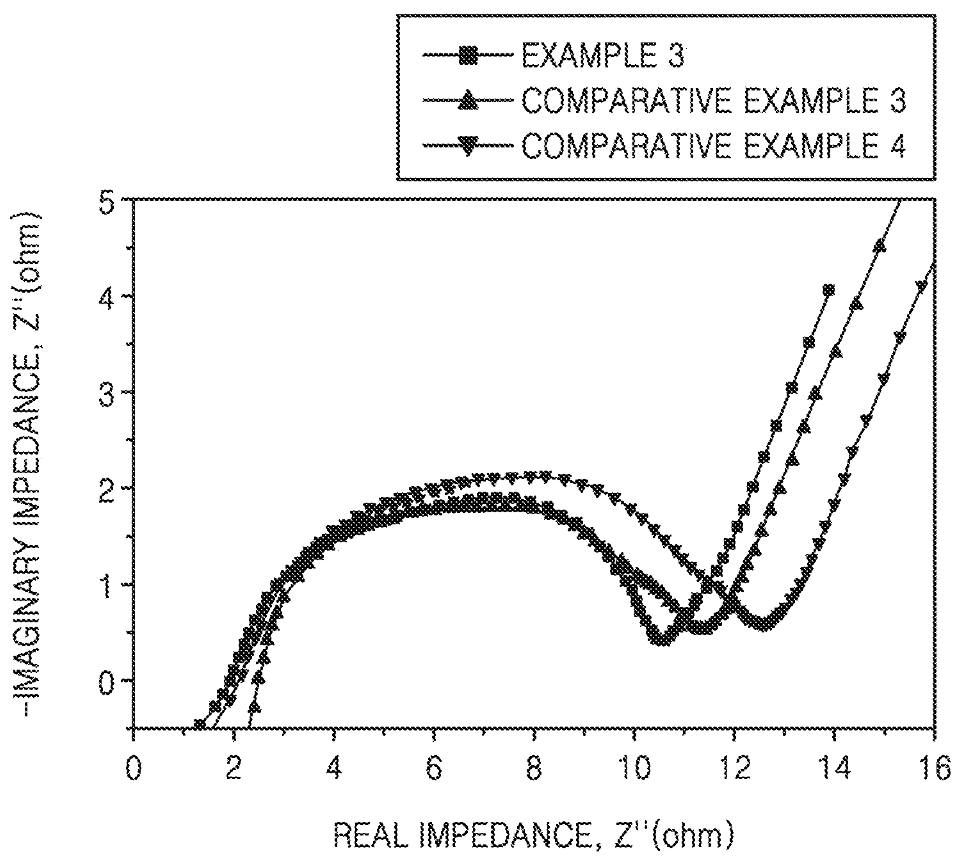
FIG. 11 is an impedance (Nyquist) plot for coin cells prepared according to Example 3 and Comparative Examples 3 and 4, after performing the high-temperature lifespan test described with respect to FIG. 10 on the coin cells.

Referring to FIG. 11, it was confirmed that the coin cell of Example 3 showed a relatively small semicircle in the impedance plot after being subjected to the high-temperature lifespan test. However, the coin cells of Comparative Examples 3 and 4 showed relatively larger semicircles in their impedance plots, demonstrating that the resistance of the coin cells of Comparative Examples 3 and 4 was significantly increased, for example due to cracks generated therein.

As described above, when a nickel-based active material for a lithium secondary battery is used, a lithium secondary battery having improved capacity, efficiency, and lifespan characteristics may be manufactured.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope as defined by the following claims and equivalents thereof.

What is claimed is:

1. A lithium nickel-based active material for a lithium secondary battery, the lithium nickel-based active material comprising:

- a secondary particle having an outer portion, a majority of particles of the outer portion being radially arranged particles, and
- a plurality of open pores, each open pore of the plurality of open pores having a size of less than 150 nm toward a center of an inner portion of the secondary particle,
- wherein particles of the inner portion and the radially arranged particles of the outer portion are substantially the same in size.

2. The lithium nickel-based active material of claim 1, wherein the secondary particle further comprises the inner portion with an irregular structure.

3. The lithium nickel-based active material of claim 1, wherein a pore size of the inner portion of the secondary particle is 150 nm to 550 nm.

4. The lithium nickel-based active material of claim 1, wherein the lithium nickel-based active material comprises a plate particle having a long axis arranged in a radial direction.

5. The lithium nickel-based active material of claim 4, wherein the plate particle has an average length of 150 nm to 500 nm and an average thickness of 100 nm to 200 nm, and a ratio of the average thickness to the average length is 1:2 to 1:5.

6. The lithium nickel-based active material of claim 1, wherein the lithium nickel-based active material is an active material represented by Formula 1:

$$Li_a(Ni_{1-x-y-z}Co_xMn_yM_z)O_2 \qquad \text{Formula 1}$$

- wherein, in Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
- a, x, y, and z satisfy the following relations: $0.95 \leq a \leq 1.3$, $x \leq (1-x-y-z)$, $y \leq (1-x-y-z)$, $z \leq (1-x-y-z)$, $0 < x < 1$, $0 \leq y < 1$, and $0 \leq z < 1$.

7. The lithium nickel-based active material of claim 6, wherein, in Formula 1, a, x, y, and z satisfy the following relations: $0.95 \leq a \leq 1.3$, $0 < x \leq 0.33$, $0 \leq y \leq 0.5$, $0 \leq z \leq 0.05$, and $0.33 \leq (1-x-y-z) \leq 0.95$.

8. The lithium nickel-based active material of claim 6, wherein:

- an amount of nickel in the lithium nickel-based active material is 33 mol % to 95 mol % based on a total amount of transition metals including nickel, cobalt, manganese, and M contained in the lithium nickel-based active material,
- the amount of nickel in the lithium nickel-based active material is higher than that of manganese, and the amount of nickel in the lithium nickel-based active material is higher than that of cobalt.

9. The lithium nickel-based active material of claim 1, wherein the lithium nickel-based active material is $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

10. The lithium nickel-based active material of claim 1, wherein an overall porosity of the lithium nickel-based active material is 1% to 8%.

11. A lithium secondary battery comprising:

a positive electrode comprising the lithium nickel-based active material of claim 1;

a negative electrode; and an electrolyte between the positive electrode and the negative electrode.

12. The lithium secondary battery of claim 11, wherein the secondary particle of the lithium nickel-based active material further comprises the inner portion with an irregular structure.

13. The lithium secondary battery of claim 11, wherein a pore size of the inner portion of the secondary particle of the lithium nickel-based active material is 150 nm to 550 nm.

14. The lithium secondary battery of claim 11, wherein the lithium nickel-based active material comprises a plate particle having a long axis arranged in a radial direction.

15. The lithium secondary battery of claim 11, wherein each of the radially arranged particles has an average length of 150 nm to 500 nm and an average thickness of 100 nm to 200 nm, and a ratio of the average thickness to the average length is 1:2 to 1:5.

16. The lithium secondary battery of claim 11, wherein the lithium nickel-based active material is an active material represented by Formula 1:

$$Li_a(Ni_{1-x-y-z}CO_xMn_yM_z)O_2 \quad \text{Formula 1}$$

wherein, in Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0<x<1$, $0 \leq y<1$, and $0 \leq z<1$.

17. The lithium secondary battery of claim 16, wherein, in Formula 1, a, x, y, and z satisfy the following relations: $0.95 \leq a \leq 1.3$, $0<x \leq 0.33$, $0 \leq y \leq 0.5$, $0 \leq z \leq 0.05$, and $0.33 \leq (1-x-y-z) \leq 0.95$.

18. The lithium secondary battery of claim 11, wherein:

an amount of nickel in the lithium nickel-based active material is 33 mol % to 95 mol % based on a total amount of transition metals including nickel, cobalt, manganese, and M contained in the lithium nickel-based active material, the amount of nickel in the lithium nickel-based active material is higher than that of manganese, and the amount of nickel in the lithium nickel-based active material is higher than that of cobalt.

19. The lithium secondary battery of claim 11, wherein the lithium nickel-based active material is $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

20. The lithium secondary battery of claim 11, wherein an overall porosity of the lithium nickel-based active material is 1% to 8%.

21. A lithium nickel-based active material for a lithium secondary battery, the lithium nickel-based active material comprising:

a secondary particle having an outer portion with a structure of radially arranged particles, and a plurality of open pores, each open pore of the plurality of open pores having a size of less than 150 nm toward a center of an inner portion of the secondary particle, wherein porosity of the inner portion is 2% to 20%, and porosity of the outer portion is 0.1% to 2%, and the porosity of the outer portion is smaller than the porosity of the inner portion.

* * * * *